United States Patent
Nakazawa et al.

(10) Patent No.: US 6,741,450 B2
(45) Date of Patent: May 25, 2004

(54) ELECTRIC DOUBLE-LAYER CAPACITOR AND METHOD FOR PREPARING THE SAME

(75) Inventors: Yutaka Nakazawa, Miyagi (JP); Ryuichi Kasahara, Miyagi (JP); Koji Sakata, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 0 days.

(21) Appl. No.: 10/320,417

(22) Filed: Dec. 17, 2002

(65) Prior Publication Data

US 2003/0147201 A1 Aug. 7, 2003

(30) Foreign Application Priority Data

Dec. 20, 2001 (JP) ..................................... 2001-388310

(51) Int. Cl.7 .................................................. H01G 9/00
(52) U.S. Cl. ...................... 361/502; 361/512; 29/25.03
(58) Field of Search ................................ 361/512, 502, 361/504, 511, 540, 541; 29/25.03

(56) References Cited

U.S. PATENT DOCUMENTS

| | | | | |
|---|---|---|---|---|
| 5,953,204 A | * | 9/1999 | Suhara et al. | 361/502 |
| 5,973,912 A | * | 10/1999 | Kibi et al. | 361/502 |
| 6,094,338 A | * | 7/2000 | Hirahara et al. | 361/502 |
| 6,301,093 B1 | * | 10/2001 | Noguchi et al. | 361/512 |
| 6,377,441 B1 | | 4/2002 | Ohya et al. | |

FOREIGN PATENT DOCUMENTS

| | | |
|---|---|---|
| JP | 60-175408 A | 9/1985 |
| JP | 03-203215 A | 9/1991 |
| WO | WO 98/40435 A1 | 9/1998 |
| WO | WO 99/02585 A1 | 1/1999 |

* cited by examiner

*Primary Examiner*—Anthony Dinkins
(74) *Attorney, Agent, or Firm*—Sughrue Mion, PLLC

(57) ABSTRACT

An electric double-layer capacitor includes a cell structure formed by laminating basic cells in series one on another. Each of the basic cells includes a pair of collectors, a separator disposed between said collectors, gaskets disposed at peripheral edges of said pair of collectors and said separator to define a pair of closed spaces, and a pair of polarizable electrodes which are disposed in said closed spaces defined by said collectors, said separator and said gaskets, respectively and which contain an electrolytic solution. The basic cells are laminated one on another with a back of each of said collectors opposed to said polarizable electrode serving as a connection surface. The electric double-layer capacitor further includes a lead terminal/electrode plate assembly having electrode plates bonded to the collectors located at opposite ends of the cell structure through conductive bond layers. At least one of interfaces between the collectors included in said cell structure has a surface shape based on a rugged surface shape of the surface of the polarizable electrode contacting with and opposed to at least one of the two collectors forming such interface. Thus, in the electric double-layer capacitor, a lower ESR can be realized both at an initial stage of the service of the capacitor and after the service of the capacitor for a long period.

19 Claims, 6 Drawing Sheets

(a)

(b)

ELECTRIC DOUBLE-LAYER CAPACITOR AND METHOD FOR PREPARING THE SAME

BACKGROUND OF THE INVENTION

1. Field of the Invention

The present invention relates to an electric double-layer capacitor, and a process for producing the same.

2. Description of the Related Art

An electric double-layer capacitor is conventionally put to practical use as a capacitor in which a high capacity on the order of farad (F) can be provided without being accompanied by a chemical reaction and which is strong to the charging and discharging of large electric current and to a charging/discharging cycle.

In recent years, a new application of such an electric double-layer capacitor as an auxiliary power source or the like of a small-sized electronic device such as a mobile phone and the like by utilizing the feature of the electric double-layer capacitor. A further reduction in size and a further increase in capacity of the electric double-layer capacitor are required.

Such an electric double-layer capacitor includes a basic cell comprising a pair of collectors, a separator disposed between the collectors, and a pair of polarizable electrodes each of which is disposed between each of the collectors and the separator and in which an electrolytic solution is contained. The collectors provided at opposite ends of a laminated-cell structure made by laminating the basic cells in series with the basic cells or their collectors as connections are electrically connected to electrode plates included in lead terminal/electrode plate assemblies through conductive bond layers, so that they are charged from and discharged to the outside.

The capacity of the cell structure can be changed easily by changing the number of the basic cells laminated and connected in series and hence, the electric double-layer capacitor is comprised of the laminated-cell structure in many cases rather than the single basic cell.

The basic cell can be produced using a producing process disclosed, for example, in U.S. Pat. No. 6,377,441 by Ohya and others.

The collector has functions to encapsulate the electrolytic solution and to provide an electric conductivity, and may be comprised a matrix formed of an electrically insulating resin and conductive particles dispersed in the matrix in many cases. In general, materials disclosed in PCT/JP98/01021 by Tsukakoshi and others and in PCT/JP98/03073 by Akita and others can be used as a resin material suitable for the collector. The thickness of the collector is conventionally about 0.2 mm, but in recent years, a thinner film having a thickness of several tens $\mu$m has been started to be used in order to meet the need for a reduction in size of the components.

The use of the electric double-layer capacitor as a variety of small-sized electronic devices such as an auxiliary power source for a mobile phone and the like is expected as described above, but an electric double-layer capacitor existing presently suffers from the following two problems in respect of equivalent series resistance (which will be referred to as ESR hereinafter) of a product, i.e., an initial inferiority and a low long-term reliability.

(1) There are many products having an initial ESR larger than a practical level. The ESR value is dispersed largely among products, resulting in a degraded yield.

(2) If a product having a small initial ESR has been put in service for a long period, its ESR is increased remarkably and for this reason, such product is not effective in service.

In a case of a thin collector film, particularly, it is difficult to ensure the long-term reliability of ESR, which is an obstacle to the real employment of the electric double-layer capacitor to an application expected.

The capacitor is used in wider applications such as an integrated circuit, a backup power source, a coupling circuit, a high-frequency circuit and the like, but the ESR is an important factor governing the overall characteristic in each of the applications. Therefore, it is desired that the ESR value is extremely small and stabilized. Particularly, when the electric double-layer capacitor is used in an application as a power source, a larger capacity and a lower ESR value are considered as ideal.

The ESR is governed mainly by a loss resistance of a dielectric material in a lower frequency range and mainly by a resistance of the component itself constituting the capacitor and a resistance between the components in a higher frequency range. What attention is paid to in the present patent application is particularly factors associated in the higher frequency range, which include (a) a resistance of the collector itself (material),
(b) a resistance of the electrode plate itself (material),
(c) a state of contact between the basic cells (between the collectors), and
(d) a state of contact between the outermost collector of the cell structure and the electrode plate.

In order to improve (c) and (d) of these factors, it has been proposed to roughen the surface of the collector which is electrically bonded to the other collector or the electrode plate through the conductive bond layer so as to increase the contact area thereof.

The collector comprises the resin matrix and the conductive particles, as described above, and electrical conduction paths are defined between an interface between the collectors or between the collector and the electrode plate and an interface between the collector and the polarizable electrode. Each of the electrical conduction paths is formed by the conductive particles connected in a row in such a manner that some of those of the conductive particles at opposite ends of the conductive particles connected in the row are exposed to the surface connected to the other collector or the electrode plate and the surface opposed to the polarizable electrode.

However, the density of conductive particles dispersed in the collector is limited for the viewpoint of a producing process and hence, the number, per unit area, of the conductive particles which are exposed to the surface and which form a portion of the electrical conduction path is limited.

Therefore, the number of the particles exposed to the surface of the collector can be increased by roughening the surface of the collector bonded to the other collector or the electrode plate to increase the surface area thereof, and as a result, the initial ESR value of an electric double-layer capacitor is decreased.

Known techniques with the above-described way of thinking introduced thereinto includes (1) a process for producing an electric double-layer capacitor
which is disclosed in Japanese Patent Application Laid-open No. 3-203215 by Takeda, wherein the surface of a collector is roughened by the abrasion suing a sandpaper; and (2) a process for producing an electric double-layer capacitor which is disclosed in Japanese Patent Application Laid-open No. 60-175408 by Okamoto, wherein when a gasket is fused to a collector using a ultrasonic process, the rugged shape formed in a horn of a ultrasonic fusing machine is transferred to the surface of the collector.

However, in the process in the item (1), it is necessary to add a roughening step, which is not preferable from a step-reducing point. In the process in the item (2), it is unnecessary to add a step, but in an electric double-layer capacitor of a thinner type in which a connector has a reduced thickness of 100 µm, which is a recent tendency, it is extremely difficult to form a ruggedness in the surface of the collector by this producing process.

In either case of the items (1) and (2), voids are formed in the collector interface due to the fact that the surface of the collector has been roughened and for this reason, it is impossible to improve the long-term reliability of the ESR characteristic.

SUMMARY OF THE INVENTION

Accordingly, it is a general object of the present invention to provide an electric double-layer capacitor and a process for producing the same, wherein the problems associated with the above-described conventional techniques can be solved, whereby a low ESR value can be realized at the initial stage of the service of the capacitor and after the service of the capacitor for a long period.

It is a particular object of the present invention to provide an electric double-layer capacitor and a process for producing the same, wherein the contact state of an interface between basic cells constituting a cell structure is good at an initial stage of production of the capacitor and after the service of the capacitor for a long period.

It is another particular object of the present invention to provide an electric double-layer capacitor and a process for producing the same, wherein the contact state of an interface between a collector included in a basic cell and a conductive bond layer is good at an initial stage of production of the capacitor and after the service of the capacitor for a long period.

To achieve the above object, according to one aspect and feature of the present invention, there is provided an electric double-layer capacitor, comprising a cell structure formed by laminating basic cells in series one on another, each of the basic cells including a pair of collectors, a separator disposed between the collectors, gaskets disposed at peripheral edges of the pair of collectors and the separator to define a pair of closed spaces, and a pair of polarizable electrodes which are disposed in the closed spaces defined by the collectors, the separator and the gaskets, respectively and which contain an electrolytic solution, the basic cells being laminated one on another with a back side of each of said collectors opposed to the polarizable electrode serving as a connection surface; a lead terminal/electrode plate assembly having electrode plates bonded to the collectors located at opposite ends of the cell structure through conductive bond layers; and at least one of interfaces between the collectors included in the cell structure, which has a surface shape based on a rugged surface shape of the surface of the polarizable electrode contacting with and opposed to at least one of the two collectors forming the interface.

With the above arrangement, the interface between the collectors has such rugged shape and hence, has an increased contact area, as compared with a case when the rugged shape is not formed. Therefore, the number of electrical conduction paths formed in the interface is increased and as a result, the initial ESR value of the electric double-layer capacitor having the above-described arrangement is decreased.

In addition, the surface shape of the interface is a rugged shape which is derived from the moderate loosening of the rugged surface shape of the polarizable electrode by the elasticity of the collector and which has a relatively gentle angle of gradient, as is a sine wave. Thus, recesses on the bonded surface of the collector are in contact with the conductive bond layer opposed thereto without creation of voids. Therefore, the electric double-layer capacitor having such arrangement has an ESR characteristic having a high long-term reliability.

To achieve the above object, according to another aspect and feature of the present invention, there is provided an electric double-layer capacitor a basic cell including a pair of collectors, a separator disposed between said collectors, gaskets disposed at peripheral edges of said pair of collectors and said separator to define a pair of closed spaces, and a pair of polarizable electrodes which are disposed in said closed spaces defined by said collectors, said separator and said gaskets, respectively and which contain an electrolytic solution, a lead terminal/electrode plate assembly including electrode plates bonded to said basic cell through conductive bond layers, with at least one of backs of the collectors of the basic cell, which are opposed to the polarizable electrodes, serving as a connection surface, and the surface of at least one of said collectors forming an interface with said conductive bond layer having a surface shape based on the rugged surface shape of the polarizable electrode contacting with said collector.

With the above arrangement, the interface between the collector and the conductive bond layer included in the electric double-layer capacitor has such rugged shape and hence, has an increased contact area, as compared with a case when the rugged shape is not formed. Therefore, the number of electrical conduction paths formed in the interface is increased and as a result, the initial ESR value of the electric double-layer capacitor having the above-described arrangement is decreased.

In addition, the surface shape of the interface is a rugged shape which is derived from the moderate loosening of the rugged surface shape of the polarizable electrode by the elasticity of the collector and which has a relatively gentle angle of gradient, as is a sine wave. Thus, recesses on the bonded surface of the collector are in contact with the conductive bond layer opposed thereto without creation of voids. Therefore, the electric double-layer capacitor having such arrangement has an ESR characteristic having a high long-term reliability.

To achieve the above object, according to a further aspect and feature of the present invention, there is provided a process for producing an electric double-layer capacitor, comprising the steps of (A) putting a collector on a flat plate and a frame-shaped gasket element having an opening into abutment against each other to define a recess with a bottom surface formed by the collector and sides formed by the inner sides of the opening in the gasket element, (B) disposing a polarizable electrode impregnated with an electrolytic solution on the bottom surface of the recess, (C) placing two intermediate products fabricated through the steps (A) and (B) and a flat plate-shaped separator, so that end faces of the gasket elements forming the openings in the intermediate products are put into abutment against peripheral edges of thickness-wise opposite surfaces of the separator, (D) thermally fusing the two gasket elements included in an assembly resulting from the step (C) integrally to each other under a pressure lower than the atmospheric pressure and equal to or higher than 67 Pa to form a gasket, and covering a side of the separator with the gasket, thereby forming a basic cell including the two intermediate products and the separator integrally bonded to each other, (E) laminating a plurality of the basic cells formed in the above manner in series one on another, so that backs of the collectors included in each of the basic cells contacting with the polarizable electrodes are bonded surfaces, thereby forming a cell structure, (F) putting the two collectors forming opposite ends of the cell structure into abutment against electrode plates included in a lead terminal/electrode plate assembly through conductive bond layers, (G) pressing the surface of a laminate fabricated at the step (F), which is in abutment against the collector, from outside the electrode plates included in the lead terminal/electrode plates.

In such producing process, a single basic cell may be used in place of the lamination of the basic cells to produce an electric double-layer capacitor.

In the producing process, the pressure in the closed spaces included in the basic cell is lower than the pressure outside the basic cell and hence, the surface of collector forming an outer side of the basic cell is formed into a rugged shape based on a rugged shape formed by the surface of the polarizable electrode contacting with such collector. Thus, the basic cell including the collector having the rugged surface shape is produced without addition of a new step for forming the ruggedness on the surface of the collector. In the electric double-layer capacitor produced using plurality of basic cell or the single basic cell, the contact area of the interface between the collectors in the former case or the interface between the collector and the conductive bond layer in the latter case is larger than that in the electric double-layer capacitor produced in the conventional producing process. Therefore, the number of electrical conduction paths formed in the interface is increased and as a result, the initial ESR value of the electric double-layer capacitor having the above-described arrangement is decreased.

In addition, the surface shape of the collector is a rugged shape which is derived from the moderate loosening of the rugged surface shape of the polarizable electrode by the elasticity of the collector and which has a relatively gentle angle of gradient, as is a sine wave. This shape is largely different from a surface shape having an acute ruggedness and provided, for example, by rubbing of the surface by a sandpaper. Thus, recess on the bonded surface of the collector is brought into contact with the conductive bond layer opposed thereto or the other collector without creation of voids. Therefore, the electric double-layer capacitor having the above-described arrangement has an ESR characteristic having a high long-term reliability.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of embodiments with reference to the accompanying drawings.

Figure 1:
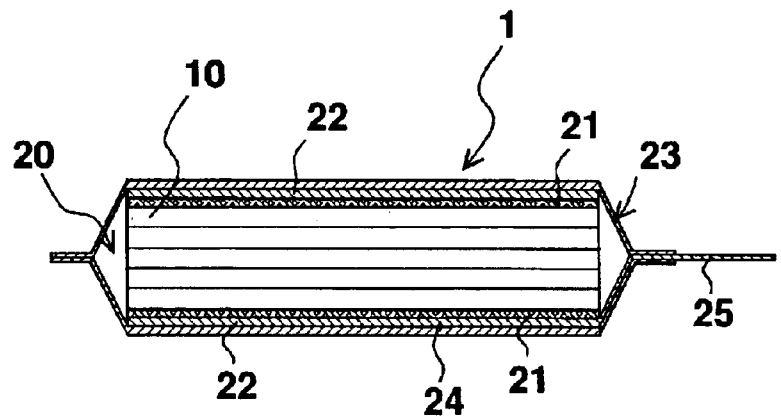
FIG. 1a is a sectional view of the arrangement of an electric double-layer capacitor comprising five basic cells laminated one on another.
FIG. 1b is a sectional view of the arrangement of a basic cell which is one element for the electric double-layer capacitor.
Figure 1:
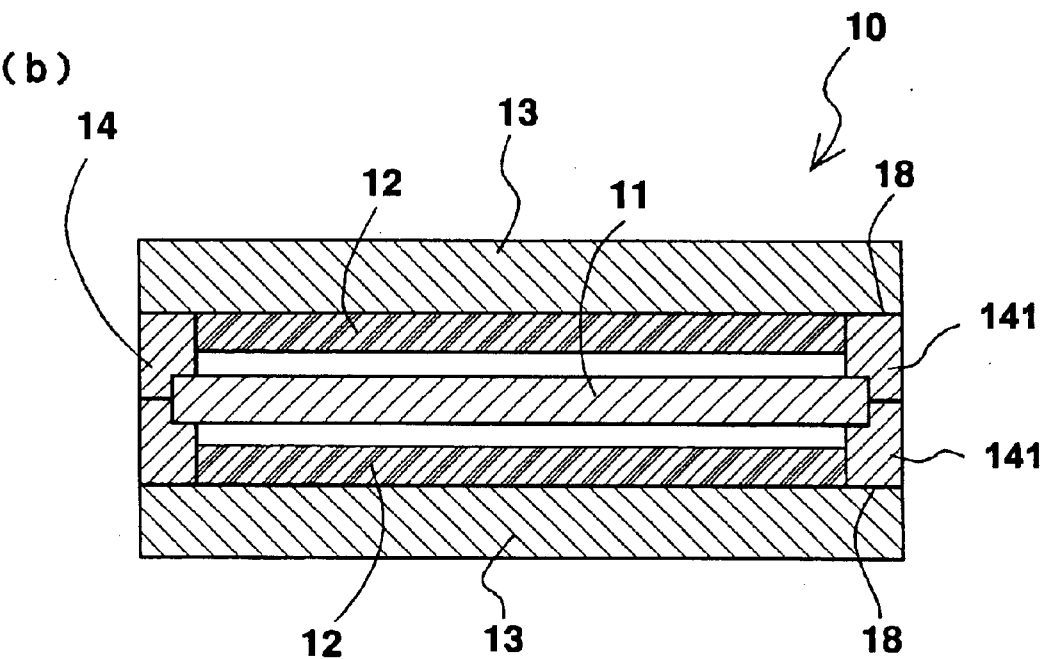

Referring to FIG. 1a, an electric double-layer capacitor 1 is comprised of a cell structure 20 constituted by sequentially laminating basic cells 10, electrode plates 24 which electrically connect collectors constituting opposite ends of the cell structure 20 to each other, conductive bond layers 21 disposed between the collectors constituting the opposite ends of the cell structure 20 and the electrode plates 24, band-shaped lead terminals 25 each constituting a lead terminal/electrode plate assembly 22 together with the electrode plate 24, and an sheathing package 23.

As shown in FIG. 1b, each of the basic cells 10 includes a pair of collectors 13, 13, a separator 11 disposed between the collectors 13, 13, and a pair of polarizable electrodes 12, 12 each of which is disposed between each of the collectors 13, 13 and the separator 11 and in which an electrolytic solution is contained. The basic cell 10 further includes frame-shaped gaskets 14 which define, together with the collectors 13, 13 and the separator 11, a pair of closed spaces in which the polarizable electrodes 12 are accommodated. Each of the gaskets 14 comprises frame-shaped gasket elements 141 bonded to each other.

Each of the basic cells 10 is bonded to the other basic cell with each of the collectors 13 serving as a joint surface, thereby forming the cell structure 20.

Figure 2:
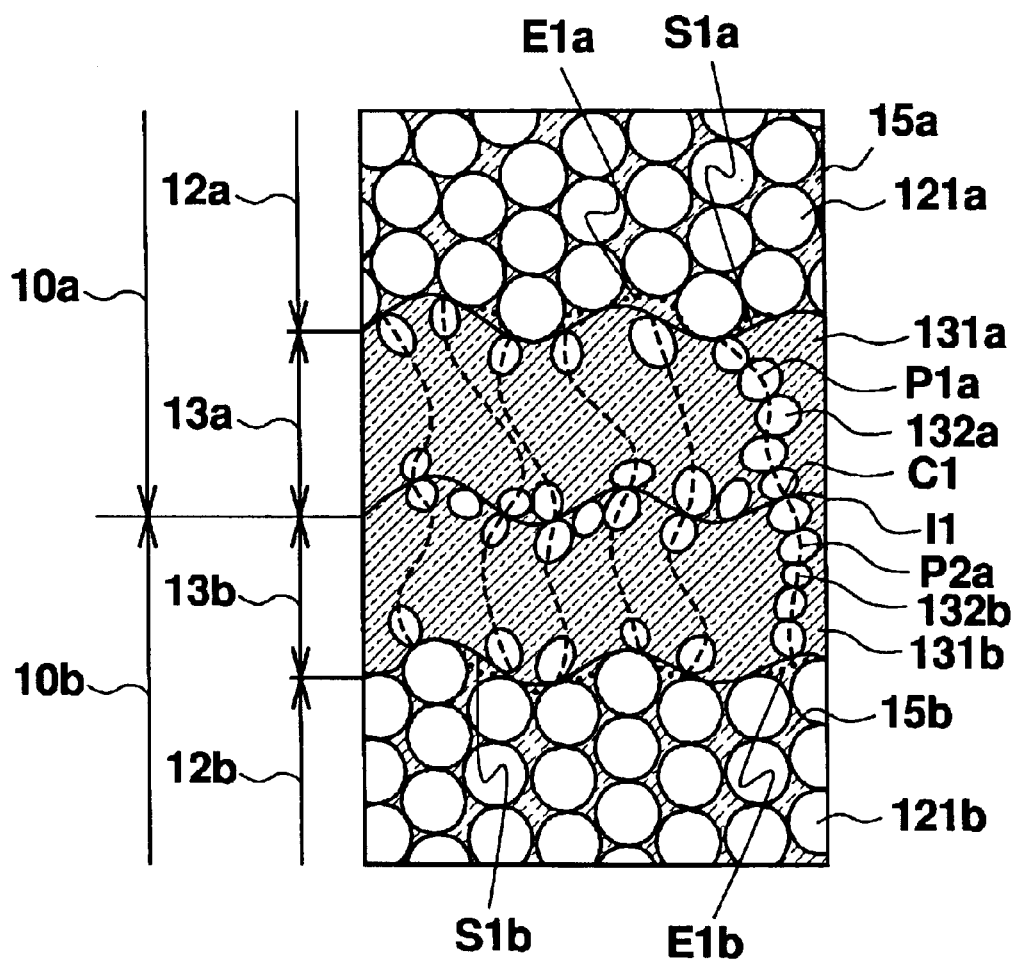
FIG. 2 is a partially sectional view notionally showing a portion of a basic cell according to the present invention extending from a collector to a portion of a polarizable electrode.

FIG. 2 is a partially sectional view notionally showing a portion of the basic cell 11 according to the present invention extending from the collector 13 to a portion of the polarizable electrode 12.

FIG. 2 is also a partially sectional view diagrammatically showing an area in the vicinity of an interface between two 10a and 10b of the basic cells constituting the cell structure 20 included in the electric double-layer capacitor according to the present invention.

As shown in FIG. 2, the basic cells 10a and 10b are bonded to each other, so that the collector 13a included in the basic cell 10a and the collector 13b included in the basic cell 10b form the interface I1.

Each of the collectors 13a and 13b has a structure in which conductive particles 132a, 132b such as carbon particles are dispersed in a matrix 131a, 131b formed of a resin such as a styrene-ethylene-butylene-styrene block polymer (SEBS).

In addition, each of the collectors 13a and 13b defines electrical conduction paths P1a, P1b between a surface S1a, S1b opposed to the polarizable electrode 12a, 12b and the interface I1 between the collectors 13a and 13b. Each of the electrical conduction paths P1a, P1b is defined in such a manner that the conductive particles 132a, 132b are connected together in a row within the collector 13a, 13b, and two of the conductive particles 132a, 132b, which form opposite ends of the row, are partially exposed to the interface I1 between the collectors 13a and 13b and the surface S1a, S1b opposed to the polarizable electrode 12a, 12b.

The electric conduction between the two basic cells 10a and 10b is ensured by the mutual contact of the conductive particles 132a and 132b of the collectors 13a and 13b exposed to the interface I1 at a contact point C1.

Each of the polarizable electrodes 12a and 12b is formed by integrally bonding conductive particles 121a, 121b such as activated carbon together by a binder resin, and further impregnated with an electrolytic solution 15a, 15b such as dilute sulfuric acid.

According to the present invention, a surface E1a, E1b of each of the polarizable electrodes 12a and 12b, which is opposed to each of the collectors 13a and 13b, has a rugged shape formed by the conductive particles 121a, 121b integrally bonded together. Each of the collectors 13a and 13b is deformed to substantially conform to the rugged shape of each of the polarizable electrodes 12a and 12b.

Therefore, the rugged shape of the polarizable electrode 12a, 12b influences even to the interface I1 between the collectors 13a and 13b and as a result, the interface I1 between the collectors 13a and 13b is also formed into a rugged shape based on the deformation of both of the collectors 13a and 13b.

In other words, the interface I1 between the collectors 13a and 13b has a rugged shape based on the surface shapes of the surfaces S1a and S1b of the polarizable electrodes 12a and 12b contacting with and opposed to the collectors 13a and 13b, respectively.

The roughness of the interface I1 is increased by such rugged shape.

The surface roughness Ry of each of the collectors 13a and 13b is dependent on a process for producing the collectors 13a and 13b to some extent, but is generally equal to or smaller than 1 $\mu$m in a state of a film-shaped material for the collectors 13a and 13b before being assembled into the basic cells 10a and 10b. Therefore, even when the collectors 13a and 13b have been assembled into the basic cells 10a and 10b, the surface roughness Ry of each of the collectors 13a and 13b is on the order of 1 $\mu$m.

On the other hand, the surface roughness Ry of the surface of each of the collectors 13a and 13b forming the outer surface of each of the basic cells 10a and 10b which are included in the electric double-layer capacitor according to the present invention and which are still not laminated to form the cell structure 20, is on the order of 10 $\mu$m. This is because such surface of each of the collectors 13a and 13b has the rugged shape based on the surface shape of each of the surfaces S1a and S1b of the polarizable electrodes 12a and 12b contacting with and opposed to the collectors 13a and 13b.

In this way, the surface roughness of the surface of each of the collectors 13a and 13b, which is before the lamination of the basic cell and which is to be bonded, is large as compared with that in the prior art and hence, the contact area of the interface I1 formed by the bonding of the collectors 13a and 13b is also increased, as compared with that in the prior art, i.e., as compared with a case where the surfaces of the collectors 13a and 13b are not rugged.

The number of those of the conductive particles 132a, 132b included in the each of the collectors 13a and 13b, which are exposed to the interface I1, is increased by the increase in surface area of the interface I1. The increase in number of the conductive particles 132a, 132b exposed to the interface I1 leads to that the number of the conductive particles 132a, 132b exposed to the interface I1 and each forming a portion of the electric conduction path P1a, P1b is also increased. The increase in number of the conductive particles 132 exposed to the interface I1 and each forming a portion of the electric conduction path P1a, P1b leads to that the number of the contact points C1 at which the electric paths P1a and P1b are in contact with each other is also increased. The increase in number of the contact points C1 provides a decrease in initial ESR value of the electric double-layer capacitor.

Therefore, the electric double-layer capacitor, in which the interface I1 between the collectors 13a and 13b has the rugged surface shape based on the surface shapes of the surface S1a and S1b of the polarizable electrodes 12a and 12b opposed to the collectors 13a and 13, shows a lower initial ESR value immediately after production thereof.

The influence of the rugged surface shape of the surface of each of the polarizable electrodes 12a and 12b opposed to each of the collectors is alleviated moderately by the collectors 13a and 13b having an elasticity attributable to the resin matrix, before it reaches the interface I1 between the collectors 13a and 13b. Therefore, the interface I1 between the collectors 13a and 13b is of a rugged shape with a relatively gentle angle of gradient, as is a sine wave, rather than an acutely serrated shape, for example, as is a surface roughened by a sand-paper.

When each of the surfaces of the collectors 13a and 13b to be bonded to each other is of such a rugged shape with a relatively gentle angle of gradient, as is a sine wave, the collectors 13a and 13b are deformed in a range of elastic deformation when they has been bonded to each other, whereby recesses of one of the collectors can be bonded to the surface of the opposed collector to form the interface without voids.

On the contrast, when each of the surfaces of the collectors 13a and 13b to be bonded to each other is of an acutely serrated shape, there is a possibility that even if the collectors 13a and 13b are deformed in a range of elastic deformation when they has been bonded to each other, some of recesses of one of the collectors cannot be bonded to the surface of the opposed collector. Therefore, there is a possibility that voids may be formed in the interface I1.

In the electric double-layer capacitor in which the interface I1 between the collectors 13a and 13b is a surface shape, based on the surface rugged shape of each of the surfaces of the polarizable electrodes 12a and 12b opposed to the collectors 13a and 13b, which is moderated to a desired extent by the elasticity of the collectors 13a and 13b, it is less feared that voids may be created in the interface I1, and the ESR value is hard to vary over a long period of service.

In the present embodiment, both of the collectors 13a and 13b bonded to each other are deformed to substantially conform to the rugged surface shapes of the surfaces of the polarizable electrodes 12a and 12b opposed to the collectors 13a and 13b, but only either one of the collectors 13a and 13b, e.g., only the collector 13a may be deformed to substantially conform to the rugged surface shape of the surface of the polarizable electrode 12a opposed to the collector 13a. In this case, the interface I1 between the collectors 13a and 13b is of a rugged shape based on the rugged surface shape of the polarizable electrode 12a opposed to the deformed collector 13a. Even in this case, the contact area of the interface I1 of such rugged surface shape is increased, leading to an effect similar to that provided when both of the collectors are deformed.

As for the collector 13a or 13b included in the basic cell 10a or 10b constituting the electric double-layer capacitor according to the present invention, it is desirable that the surface roughness Ry of its surface to be bonded to the other collector 13b or 13a before the lamination of the basic cells is in a range of from about 5 μm (inclusive) to about 100 μm (inclusive). If the surface roughness Ry of such surface is smaller than about 5 μm, the contact area of the interface I1 formed by the bonding of such collector to the other collector 13b or 13a is not increased remarkably because the degree of recesses and projections on such surface is not high enough, as compared with a case where the surface is not rugged. Therefore, the number of the electric conduction paths P1 is difficult to increase sufficiently to provide such an effect that the ESR characteristic is enhanced remarkably.

On the other hand, if the surface roughness Ry of the surface of the collector 13a or 13b to be bonded to the other collector 13b or 13a is larger than about 100 μm, larger numbers of recesses and projections exceeding the range of elastic deformation of the collector 13a, 13b are formed in many cases. Therefore, there is a possibility that voids are created in the interface formed by the bonding of such collector to the other collector 13b or 13a, and it is difficult to provide the long-term reliability of the ESR characteristic.

It is desirable that the pressure in the closed spaces including the polarizable electrodes 12a and 12b and the electrolytic solutions 15a and 15b in the basic cells 10a and 10b is lower than the atmospheric pressure outside the basic cells 10a and 10b and equal to or higher than about 67 Pa.

Because the pressure in the closed spaces is lower than the outside pressure, the collectors 13a and 13b are deformed to decrease the volumes of the closed spaces and as a result, are pushed against the polarizable electrodes 12a and 12b. Therefore, the collectors 13a and 13b are deformed to further substantially conform to the rugged surface shapes of the surfaces of the polarizable electrodes 12a and 12b opposed to the collectors 13a and 13b, as compared with a case where there is not such a pressure difference. As a result, the roughness of the interface I1 between the collectors 13a and 13b is increased and thus, the contact area of the interface is further increased.

However, if the pressure in the closed spaces is lower than 67 Pa, the electrolytic solutions 15a and 15b in the closed spaces are boiled even at ambient temperature. For this reason, the electric double layer formed the polarizable electrodes is instable and as a result, an electricity-accumulating ability which is the most basic ability of the electric double-layer capacity is instable.

Therefore, in the electric double-layer capacitor in which the pressure in the closed spaces included in the basic cells 10a and 10b is lower than the pressure outside the basic cells 10a and 10b and equal to or higher than 67 Pa, the contact area of the joint surface between the basic cells 10a and 10b is increased, leading to an enhancement in ESR initial characteristic.

Further, a desired electric double-layer capacitor is constructed so that the pressure in the sheathing package 23 is lower than the pressure outside the sheathing package 23 and higher than the pressure in the closed spaces included in the basic cells 10a and 10b.

Because the pressure in the closed spaces included in the basic cells 10a and 10b is lower than the pressure outside the basic cells 10a and 10b, as described above, the collectors 13a and 13b are pushed against the polarizable electrodes 12a and 12b contacting with the collectors and as a result, the contact area of the interface I1 is increased.

Further, because the pressure in the sheathing package 23, i.e., outside the basic cells 10a and 10b is lower than the pressure outside the sheathing package 23, the sheathing package 23 pushes the cell structure 20 and the electrode plates 24 from the side of the electrode plates 24. This pushing force is transmitted to even the basic cells 10a and 10b constituting the cell structure 20 and also exerted to the interface I1. Therefore, the collectors 13a and 13b are pushed further strongly against the polarizable electrodes 12a and 12b, whereby the interface I1 between the collectors 13a and 13b is roughened under the influence of the ruggedness of the surfaces of the polarizable electrodes 12a and 12b opposed to the collectors 13a and 13b.

As a result, the contact area of the interface I1 is further increased, leading to a further enhancement in ESR initial characteristic of the electric double-layer capacitor.

According to the present invention, it is important that the rugged shape based on the ruggedness of the surfaces of the polarizable electrodes 12a and 12b opposed to the collectors 13a and 13b is provided to the interface I1 between the collectors 13a and 13b, as described above. From such viewpoint, desired examples of the thickness of and materials for the polarizable electrodes 12a and 12b and the collectors 13a and 13b are described below.

The particle size of the conductive particles 121a and 121b included in the polarizable electrodes 12a and 12b is desirable to be in a range of from about 10 μm (inclusive) to about 20 μm (inclusive). In this case, the roughness Ry of the interface I1 between the collectors 13a and 13b included in the basic cells 10a and 10b which are still not laminated is liable to be in a range of from about 5 μm (inclusive) to about 100 μm (inclusive), which is mentioned as a preferable range above.

The shape of the conductive particles 121a and 121b is particularly not limited, but it is desirable that the conductive particles 121a and 121b have a shape nearer to a spherical shape and do not have an acute angular shape. This is because it is less feared that the collectors 13a and 13b are broken, and a rugged shape with a relatively gentle gradient is more likely to appear in the interface I1 between the collectors 13a and 13b.

The thickness of the collectors 13a and 13b is preferable to be in a range of from about 20 μm (inclusive) to about 100 μm (inclusive). If the thickness is smaller than about 20 μm, there is a possibility that the breakage of the collectors 13a and 13b occurs in the course of production of the electric double-layer capacitor and during service of the electric double-layer capacitor. On the other hand, if the thickness is larger than 100 μm, even if the collectors 13a and 13b and the polarizable electrodes 12a and 12b are in contact with each other, the rugged surface shapes of the surface of the polarizable electrodes 12a and 12b contacting with the collectors 13a and 13b are influenced within the collectors 13a and 13b by the elasticity of the collectors, leading to a reduced acuteness of rugged interface I1 between the collectors 13a and 13b. Therefore, the rugged shape is less likely to appear in the interface I1 between the collectors 13a and 13b and as a result, the electric double-layer capacitor with a low initial ESR value is difficult to obtain.

A starting material for the resin matrix constituting the collectors 13a and 13b is desirable to include a thermoplastic elastomer. Particular examples of the starting material are a styrene-ethylene-butylene-styrene block polymer (SEBS), a styrene-ethylene-propylene-styrene block polymer (SEPS), an ethylene-propylene rubber (EPM) and the like.

When the collector is formed of an elastomer, it is particularly preferable that the hardness Hs of the elastomer as the starting material at ambient temperature is in a range of from about 55 (inclusive) to smaller than about 85. The term "hardness Hs" used herein means an instantaneous value of an A-type defined by JIS K6301. In addition, the term "ambient temperature" indicates a general range of temperature in an industrial production site and means a range of 10 to 30° C.

If the hardness Hs is smaller than about 55, the collector is difficult to handle and cannot be used as a part for the electric double-layer capacitor.

In addition, if the hardness Hs is smaller than about 55, it is difficult for the following reason to provide the long-term reliability of the ESR characteristic of the electric double-layer capacitor. In the course of production of the electric double-layer capacitor and during service of the electric double-layer capacitor, a gas resulting from the gasification of the electrolytic solution 15a, 15b may be transmitted through the collector 13a, 13b to reach the interface I1 between the collectors 13a and 13b, and the pressure of the transmitted gas may be applied to the interface I1 between the collectors 13a and 13b, whereby voids may be created in some cases. If the hardness Hs of the collectors 13a and 13b is smaller than about 55, the collectors 13a and 13b cannot resist the pressure of such transmitted gas and for this reason, voids are easily created, resulting in a reduction in long-term reliability of the ESR characteristic.

On the other hand, if the hardness Hs is larger than about 85, the collectors 13a and 13b are difficult to deform in conformity with the rugged surface shape of the surfaces of the polarizable electrodes 12a and 12b. For this reason, the rugged shape based on the rugged surface shape of the polarizable electrodes 12a and 12b is difficult to appear in the interface I1. Therefore, the initial ESR value of the electric double-layer capacitor is difficult to decrease.

It will be described below with reference to FIG. 3 that an electric double-layer capacitor in which a collector 13 forming an end of outermost one of basic cells 10 laminated on one another to form a cell structure 20 is bonded to an electrode plate 24 through a conductive bond layer 21 in a manner similar to the construction of the interface I1 between the above-described collectors 13a and 13b, is also an electric double-layer capacitor having a good ESR characteristic.

Figure 3:
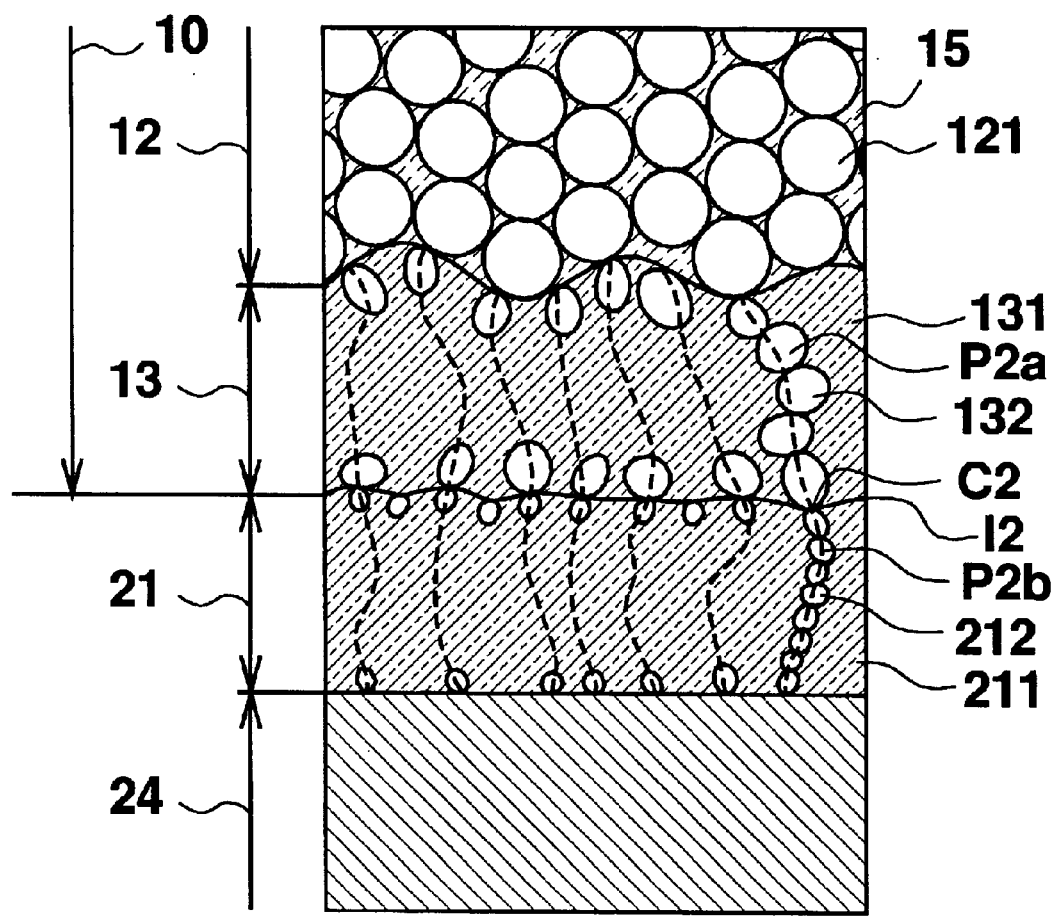
FIG. 3 is a partially sectional view notionally showing an area in the vicinity of an interface between a collector and a conductive bond layer in an electric double-layer capacitor according to the present invention.

FIG. 3 is a partially sectional view notionally showing an area in the vicinity of an interface I2 between a collector 13 and a conductive bond layer 21 in an electric double-layer capacitor according to the present invention.

As shown in FIG. 3, the collector 13 forming an end of a cell structure 20 is bonded to an electrode plate 24 through the conductive bond layer 21. The collector 13 is provided with electric conduction paths P2a each formed by connecting conductive particles 132 in a row, and a conductive particle 132 forming an end of each of the paths P2a is exposed to the interface I2 between the collector 13 and the conductive bond layer 21.

The conductive bond layer 21 includes a resin matrix 211 and conductive particles 212 dispersed within the matrix. Electric conduction paths P2 are formed in the conductive bond layer 21 by connection of the conductive particles 212 in rows, as in the collector 13. Some of the conductive particles 212 connected in the rows and exposed to the interface I2 are connected to the electric conduction paths P2a in the collector 13 to form contact points C2. The electric conduction between the collector 13 and the electrode plate 24 is ensured by the contact points C2.

The surface shape of the interface I2 between the collector 13 and the conductive bond layer 21 is a rugged shape based on the rugged shape formed by the conductive particles 121 present in the polarizable electrode 12 on a side opposed to the collector 13. The surface area of the interface I2 is increased attributable to the rugged shape, as compared with a case where the interface is not rugged. The increase in surface area of the interface I2 leads to an increase in number of those of the conductive particles 132 included in the collector 13, which are exposed to the interface I2. The increase in number of conductive particles exposed to the interface I2 leads to an increase in number of conductive particles exposed to the interface and each forming a portion of the electric conduction path P2a. The increase in number of conductive particles each forming a portion of the electric conduction path P2a and exposed to the interface 12 leads to an increase in number of the contact points C2 at which the electric conduction paths P2a and P2b are in contact with each other. The increase in number of the contact points C2 provides a decrease in initial ESR value of the electric double-layer capacitor.

The shape of the surface of the collector 13 opposed to the conductive bond layer 21 is a rugged shape with a gentle angle of gradient, as is a sine wave, because it is based on the rugged shape of the surface of the polarizable electrode opposed to the collector 13. Therefore, recesses on the surface of the collector 13 are in contact with the conductive bond layer 21 opposed to the collector 13 without creation of voids. Thus, the electric double-layer capacitor having such arrangement has an ESR characteristic having a high long-term reliability.

The desired forms of the collector 13 bonded to the conductive bond layer 21, the polarizable electrode 12 opposed to the collector 13, the basic cell 10 including the collector 13 and the polarizable electrode 12, and the electric double-layer capacitor 1 including the basic cell 10 are as follows:

The surface roughness Ry of the surface of the collector 13 to be bonded to the conductive bond layer 21 is desirable to be in a range of from about 5 $\mu$m (inclusive) to about 100 $\mu$m (inclusive).

It is also desirable that the pressure in the closed space including the polarizable electrode 12 and the electrolytic solution 15 in the basic cell 10 including the collector 13 connected to the electrode plate 24 through the conductive bond layer 21 is a pressure lower than the pressure outside the basic cell 10 and is equal to or higher than about 67 Pa.

Further, an electric double-layer capacitor formed in the following manner is desirable: The pressure in the sheathing package 23 is lower than the pressure outside the sheathing package 23 and higher than the pressure in the closed space provided in the basic cell 10 including the collector 13 connected to the electrode plate 24 through the conductive bond layer 21.

The particle size of the conductive particles 121 included in the polarizable electrode 12 is desirable to be in a range of from about 10 $\mu$m (inclusive) to about 20 $\mu$m (inclusive). The shape of the conductive particles 121 is particularly not limited, but it is desirable that the conductive particles 121a and 121b have a shape nearer to a spherical shape and do not have an acute angular shape.

The thickness of the collector 13 is preferable to be in a range of from about 20 μm (inclusive) to about 100 μm (inclusive). A starting material for the resin matrix constituting the collector 13 is desirable to include a thermoplastic elastomer. The hardness Hs of the thermoplastic elastomer at ambient temperature is particularly preferable to be in a range of from about 55 (inclusive) to lower than about 85.

Desirably, the starting material for the resin matrix 211 of the conductive bond layer 21 includes a material which will be an elastomer upon the formation of the conductive bond layer. For example, a silicone rubber, a butyl rubber or the like may be used, but a fluoro-elastomer which is an elastomer containing fluorine is particularly desirable. Examples of the fluoro-elastomer are vinylidene fluoride-based resin, a fluorosilicone-based resin, a polytetrafluoroethylene (PTFE) and the like. A conductive bond layer having an excellent high-temperature strength can be formed by using such a material. This conductive bond layer is difficult to deform even by the pressure of a transmitted gas resulting from the gasification of the electrolytic solution.

The hardness Hs of such an elastomer at ambient temperature is desirable to be in a range of about 60 (inclusive) to about 80 (inclusive). In this case, the conductive bond layer is elastically deformed to a moderate extent in conformity to the rugged shape of the surface of the collector 13, whereby the area of the interface I2 is increased to easily form contact points C2. In addition, even if the gas resulting from the gasification of the electrolytic solution is transmitted through the inside of the collector 13 to reach the interface I2, the interface I2 can resist the pressure of the transmitted gas and as a result, voids are difficult to appear in the interface I2.

The size of and the material for the conductive particles 212 in the conductive bond layer 21 are particularly not limited, but the size should be selected in consideration of the thickness of the conductive bond layer 21, and the material should be selected in consideration of the compatibility to the resin matrix 211 and a conductive particle-producing step. In the embodiment, a silver powder is used.

The electric double-layer capacitor having the structure including the cell structure 20 interposed between the two electrode plates 24 has been described above. However, the electric double-layer capacitor may be of a structure in which a single basic cell 10 is interposed between two electrode plates 24. In this case, if the surface of at least one of the collectors 13 included in the basic cell 10, which is bonded to the conductive bond layer 21, has a rugged shape based on the rugged surface shape of the surface of the polarizable electrode 12 opposed to such collector 13, the surface area of the interface between the collector 13 and the conductive bond layer 21 is increased, as compared with a case where the above-described surface does not have a rugged shape. Therefore, a large number of electrical connection points are formed on the surface of the collector 13 opposed to the conductive bond layer 21, leading to an enhancement in initial ESR characteristic of the electric double-layer capacitor.

The shape of the surface of the collector 13 opposed to the conductive bond layer 21 is based on the rugged surface shape of the surface of polarizable electrode 12 opposed to the collector 13 and hence, is a rugged shape with a relatively gentle angle of gradient, as is a sine wave. Therefore, recesses of the surface of the collector 13 are in contact with the conductive bond layer 21 without creation of voids. Thus, the electric double-layer capacitor having the above-described structure has an ESR characteristic having a high long-term reliability.

An embodiment of a process for producing a basic cell for an electric double-layer capacitor according to the present invention will be described below with reference to FIG. 4.

Figure 4:
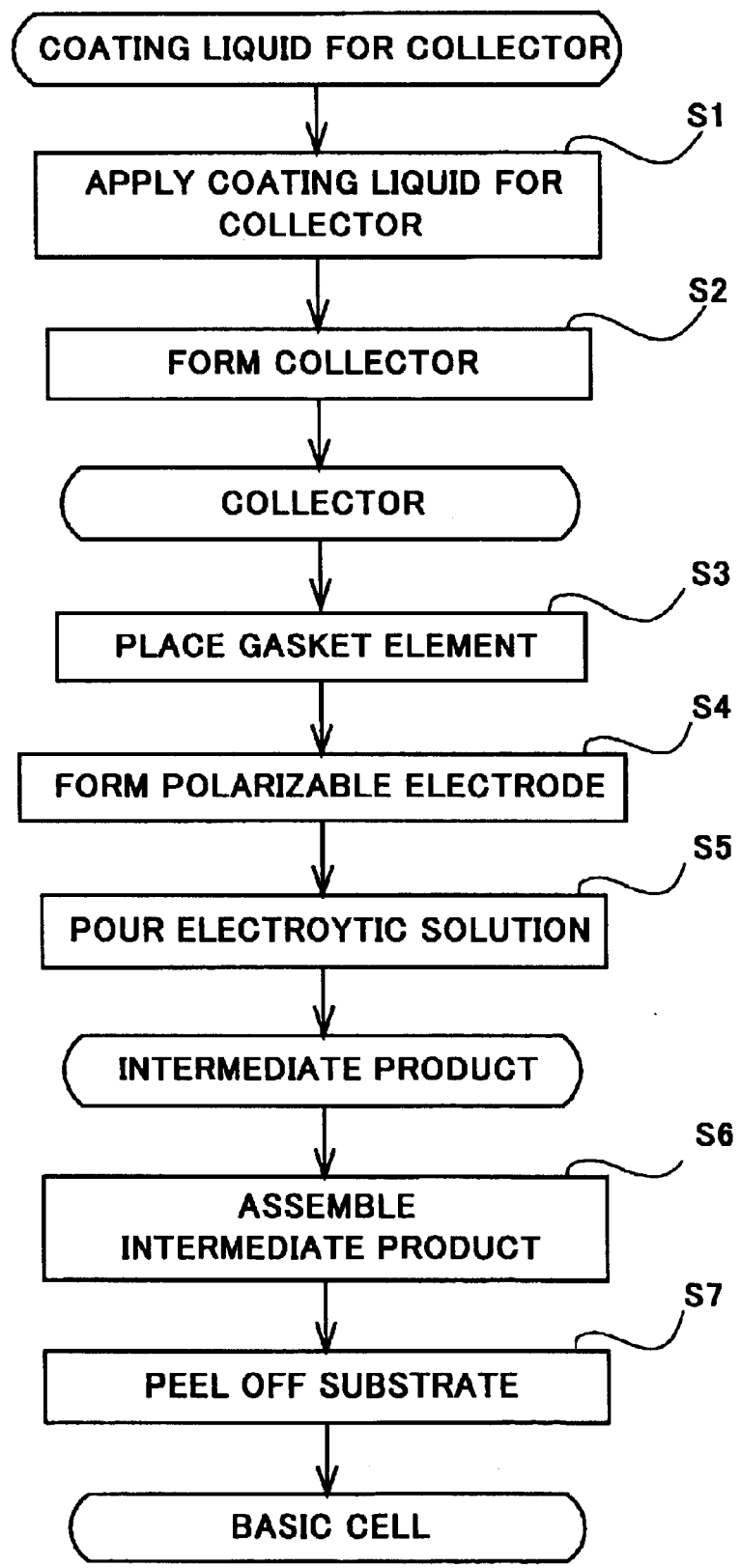
FIG. 4 is a flow diagram showing essential stages of one example of a procedure for producing a basic cell for an electric double-layer capacitor according to the present invention.

FIG. 4 is a flow diagram showing essential stages of one example of a procedure for producing a basic cell for an electric double-layer capacitor according to the present invention.

(S1) Application of Coating Liquid for Collector

A starting resin material including an olefin resin, conductive particles 132 and a solvent are mixed together to form a coating liquid for a collector. It is desirable from the viewpoint of handleability that the mixing ratio of the starting resin material to the conductive particles 132 is in a range of about 10:40 to about 10:60 by weight.

A thermoplastic elastomer is preferred as the starting resin material including the olefin resin for a collector 13. Examples of the thermoplastic elastomer are a styrene-ethylene-butylene-styrene block polymer (SEBS), a styrene-ethylene-propylene-styrene block polymer (SEPS), an ethylene-propylene rubber (EPM) and the like. However, the present invention is particularly not limited by this description.

Examples of the conductive particles 132 for the collector, which may be used, are a carbon filler, a graphite filler, a fine metal powder, electrically-insulating particles coated with a conductive material and the like.

The solvent is particularly not limited, but examples of the solvent which may be used are ketones such as methyl ethyl ketone, alcohols such as isopropyl alcohol, ethers such as diethyl ether, furans such as tetrahydrofuran, and a mixture of two or more of them.

Then, the coating liquid for the collector is applied onto a substrate such as a film by a coater. The application maybe carried out in a usual manner, e.g., by use of a bar coater, a roll coater or the like. The thickness of the coated film, i.e., the thickness of the collector, is controlled by regulating the distance between the coater and the substrate, the viscosity of the coating liquid, the amount of coating liquid supplied and the like.

If the thickness of the collector 13 is preferable to be in a range of from about 20 μm (inclusive) to about 100 μm (inclusive). If the thickness is smaller than about 20 μm, there is a possibility that the breakage of the collector 13 occurs in a course for producing an electric double-layer capacitor and during service of the electric double-layer capacitor. On the other hand, if the thickness is larger than 100 μm, the rugged shape of the polarizable electrode 12 is influenced within the collector 13 by the elasticity of the collector 13, leading to a reduced acuteness of rugged surface of the collectors 13, even if the collector 13 and the polarizable electrode 12 are in contact with each other. For this reason, the rugged shape is difficult to appear in the surface of the collector 13 forming the outermost side of the basic cell 10.

(S2) Formation of Collector

The coating liquid applied is subjected to a baking/film-forming treatment, whereby the solvent is removed from the coating liquid by heating to form a collector 13.

The thus-formed collector 13 has a structure in which the conductive particles 132 are dispersed moderately in a matrix 131 formed of an elastomer made by the crosslinking of the starting resin material.

It is desirable that the starting material for the matrix in the collector 13 is an elastomer having a hardness Hs in a range of from about 55 (inclusive) to about 85 (inclusive) at ambient temperature.

The use of the elastomer having the hardness Hs in the range of from about 55 (inclusive) to about 85 (inclusive) at ambient temperature as the starting material for the matrix 131 constituting the collector 13 ensures that a good bonded state is realized in an interface between collectors 13 or in an interface between the collector 13 and a conductive bond layer 21 in a cell structure 20. Therefore, an electric double-layer capacitor having such a structure exhibits a low initial ESR value and has an ESR characteristic having a high long-term reliability.

In a course for producing an electric double-layer capacitor and during service of the electric double-layer capacitor, the electrolytic solution 15 may be gasified and transmitted through the collector, and the resulting gas may reach to an interface between the collectors 13 or an interface between the collector 13 and the conductive bond layer 21 in the cell structure 20 in some cases. In this case, if the hardness of the starting material is lower than about 55, the collector 13 cannot resist the pressure of the transmitted gas and is deformed significantly. On the other hand, if the hardness is equal to or higher than about 85, the collector 13 is difficult to deform in conformity with the rugged shape of the surface of the polarizable electrode 12 opposed to the collector and hence, the surface area of the interface is difficult to increase.

(S3) Placement of Gasket Film

An electrically insulating frame-shaped gasket element 141 having an opening defined therein for accommodation of the collector 13 formed on the substrate is placed on the surface of the substrate, so that it is in close contact with a side of the collector 13.

Then, the collector 13 and the gasket element 141 may be thermally fused to each other.

(S4) Formation of Polarizable Electrode

A coating liquid comprising a powder of activated carbon, a binder and a solvent is applied onto the collector 13, and the solvent is removed by heating and drying the liquid to aggregate the activated carbon, thereby forming a polarizable electrode 12. At this time, the thickness of the polarizable electrode 12 is determined by rubbing-off of the coating liquid in accord with the level of an upper surface of the gasket element 141, and is substantially equal to the thickness of the gasket element 141.

It is desirable that the activated carbon powder which is a conductive material for the polarizable electrode has a shape nearer to a spherical shape and does not have an acute angular shape. This is because it is less feared that the collectors 13a and 13b are broken, and a rugged shape with a relatively gentle gradient is easy to appear in the interface I1 between the collectors 13a and 13b.

Further, it is desirable that the particle size of the activated carbon powder which is a conductive material for the polarizable electrode is in a range of about 10 μm to about 20 μm. In this case, the surface roughness Ry of the surface of the collector 13 bonded to another member in the assembled basic cell 10 is liable to be in a range of about 5 μm to about 100 μm.

(S5) Pouring of Electrolytic Solution

An electrolytic solution 15 is poured into an area surrounded by the collector 13 and the gasket element, and permeated into the polarizable electrode 12. The electrolytic solution which is preferable is a dilute aqueous solution of sulfuric acid providing a high electric conductivity.

It should be noted that a product made through the steps S1 to S5 is an intermediate product.

(S6) Assembling

Two intermediate products are placed so that their surfaces on the side of the polarizable electrode 12 are opposed to each other with a separator 11 of a flat shape interposed therebetween, and the gasket element 141 is put into abutment against a surface or back of an outer peripheral portion of the separator 11. The gasket element 141 and the collector 13 as well as the gasket elements 141, 141 of the intermediate products are thermally fused to each other in an environment depressurized to a pressure lower than the atmospheric pressure (this pressure is represented by p1). This thermal fusion results in two closed spaces defined in a basic cell 10 by the two collector 13 and the single separator 11 and a gasket 14 each formed by the two gasket elements 141 thermally fused to each other. The polarizable electrode 12 impregnated with the electrolytic solution 15 exists in each of the closed spaces defined in the above manner. The thermal fusion is carried out under the depressurization and hence, the inside of each of the two closed spaces is of a depressurized state (this pressure is represented by p1').

According to the present invention, the pressure for carrying out the thermal fusion is a value lower than the atmospheric pressure, as described above, but is desirable to be equal to or higher than about 67 Pa. If such pressure is lower than about 67 Pa, the electrolytic solution 15a, 15b within each of the closed spaces is boiled even at ambient temperature. For this reason, the volume of the electrolytic solution is decreased and as a result, the electric double layer formed the polarizable electrodes is instable. Thus, an electricity-accumulating ability which is a most basic ability of the electric double-layer capacity is instable.

(S7) Completion of Basic Cell

The substrate is peeled off from the collector 13 and the gasket 14 to complete a basic cell 10. The sectional arrangement of the basic cell 10 is as shown in FIG. 1b.

Figure 5:
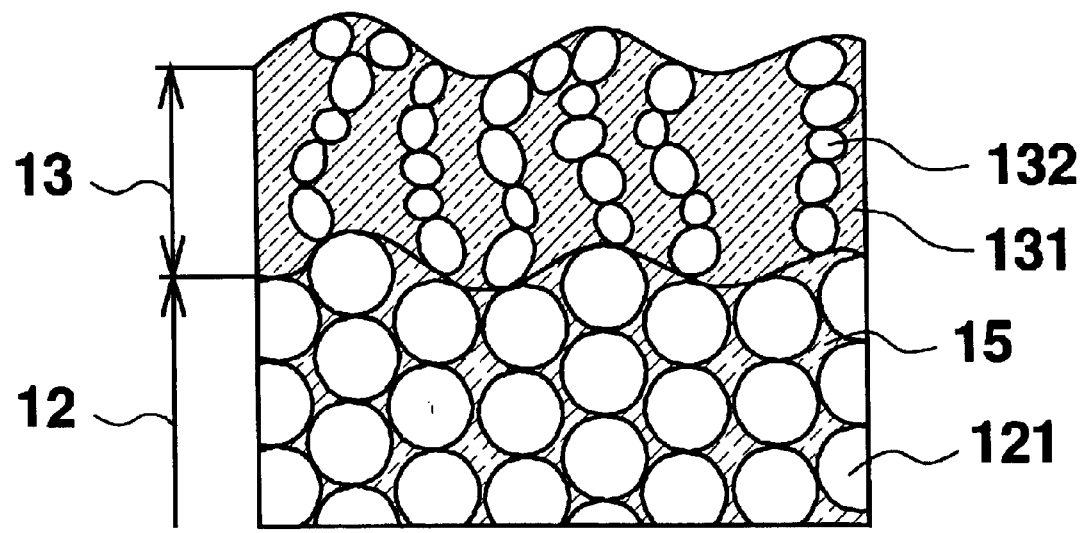
FIG. 5 is a sectional view notionally showing the state of a region in a basic cell produced in a process for producing process an electric double-layer capacitor according to the present invention, the region extending from a polarizing electrode to the surface of a collector.

The state of a region in the basic cell 10 fabricated in the above-described producing process, which extends from the polarizing electrode 12 to the surface of the collector 13, is shown in FIG. 5.

As shown in FIG. 5, the collector 13 includes a resin matrix 131 and conductive particles 132. The conductive particles 132 are connected in rows, and those of the conductive particles 132 connected in rows, which form opposite ends of the rows, are exposed to a surface forming an outer side of the basic cell 10 and an interface between the polarizable electrode 12 and the collector 13, respectively.

Further, the collector 13 is deformed to substantially conform to the rugged surface shape of the side of the polarizable electrode 12 opposed to the collector 13, and hence, the surface of the collector 13 forming the outer side of the basic cell 10 is of a rugged shape based on the rugged shape of the polarizable electrode 12.

The rugged shape is caused attributable to that the pressure p1' in the two closed space in the basic cell 10 is set at the value lower than the pressure outside the basic cell 10 at the step S6.

More specifically, because the pressure in the closed space is lower than the pressure outside the basic cell 10, the collector 13 is deformed to decrease the volume of each of the closed spaces and as a result, the collector 13 is pushed against the polarizable electrode 12. Therefore, the collector 13 is deformed to substantially conform to the rugged surface shape of the surface of the polarizable electrode 12 opposed to the collector 13. As a result, a rugged surface shape based on the rugged surface shape of the surface of the polarizable electrode 12 opposed to the collector 13 is also realized in the surface of the collector 13 forming the outer side of the basic cell 10. In an electric double-layer capacitor including as a component the basic cell 10 provided with the collector 13 having such rugged surface shape, the contact area of the interface between the collectors 13 or the interface between the collector 13 and the conductive bond layer 21 is increased, as compared with a case where the surface shape is not rugged. Therefore, the initial ESR value of the electric double-layer capacitor is lower.

Such rugged surface shape of the collector 13 is a rugged shape derived from the moderate loosening of the rugged surface shape of the surface of the polarizable electrode opposed to the collector 13, i.e., a rugged shape with a gentle angle of gradient, as is a sine wave. Therefore, when the collector 13 is bonded to the other member, i.e., the other collector 13 or the conductive bond layer 21, recesses on the collector 13 can be easily bonded to the other member. Thus, an interface free from voids is formed, and an electric double-layer capacitor having such a structure has an ESR characteristic having a high long-term reliability.

One of points which should be specially mentioned is that the step S6 is a step of assembling the two intermediate products and the separator 11 to each other and at the same time, forming a moderate ruggedness in the surface of the collector 13 forming the outer side of the basic cell 10. The thermally fusing step may be merely carried out under the depressurization, as described above. In this case, a new ruggedness-forming step is not required to be added, and even for an electric double-layer capacitor including a collector 13 having a thickness equal to or smaller than 100 $\mu$m, a moderate ruggedness can be formed on the surface of the collector 13 bonded to the other member.

It is desirable that the roughness Ry of the surface of the collector 13 forming the outer side of the basic cell 10 is in a range of about 5 $\mu$m (inclusive) to about 100 $\mu$m (inclusive).

If the roughness Ry of the surface of the collector 13 forming the outer side of the basic cell 10 is smaller than about 5 $\mu$m, an increase in surface area attributable to the surface shape being the rugged shape is smaller. Therefore, it is difficult to provide such an effect that the ESR characteristic is enhanced remarkably.

On the other hand, if the roughness Ry of the surface of the collector 13 forming the outer side of the basic cell 10 is larger than about 100 $\mu$m, large numbers of recesses and projections exceeding a range of elastic deformation of the collector 13 may be formed in many cases. Therefore, it is feared that voids may be created in an interface between the collector 13 and the other member and thus, it is difficult to provide a long-term reliability of the ESR characteristic.

Then, an electric double-layer capacitor is fabricated using the basic cell 10 made in the above manner. The flow of a procedure of producing the electric double-layer capacitor will be described below with reference to FIG. 6.

Figure 6:
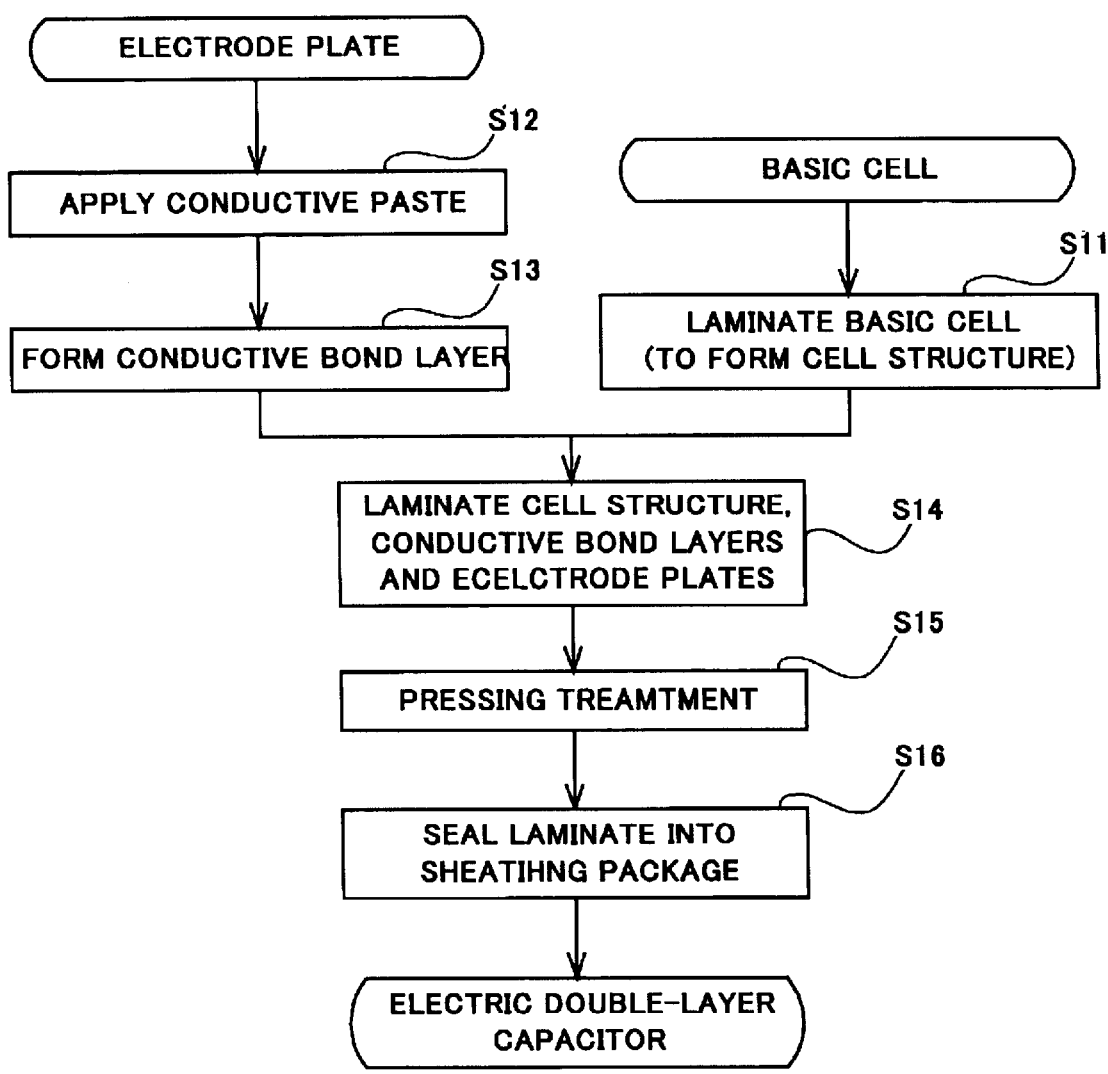
FIG. 6 is a flow diagram showing essential stages of one example of a procedure for producing a basic cell for an electric double-layer capacitor according to the present invention.

FIG. 6 is a flow diagram showing essential stages of one example of a procedure for producing a basic cell for an electric double-layer capacitor according to the present invention.

(S11) Lamination of Basic Cells

A number of basic cells 10 required for a required capacity of a capacitor are laminated one on another to form a cell structure 20.

In the lamination of the basic cells, it is desirable that the collectors 13, 13 bonded in the cell structure 20 are bonded to each other without formation of voids in an interface therebetween. According to the present invention, the surface shape of the surface of the collector 13 bonded is the rugged shape based on the surface shape of the surface of the polarizable electrode 12 contacting with the collector 13 and opposed to the collector 13 and hence, when the collectors are bonded to each other, voids are difficult to appear in the interface therebetween.

In the above description, the plurality of basic cells 10 have been laminated one on another, but a single basic cell may be used. Even in this case, the subsequent steps can be carried out in a similar manner, and an effect equivalent to that in the case of the cell structure 20 can be provided.

(S12) Application of Conductive Paste

Independently from the cell structure 20, a conductive bond layer 21 is formed on one of surfaces of an electrode plate 24 of a lead-terminal/electrode plate assembly 22.

First, a conductive paste resulting from the kneading of a binder resin, conductive particles 212 and a solvent is prepared.

It is desirable that a starting material for the binder resin includes a material which will be an elastomer upon formation of a conductive bond layer 21. Examples of such elastomer which may be used are a silicone rubber, a butyl rubber and the like, but a fluoro-elastomer which is an elastomer containing fluorine is particularly preferred. Typical of the fluoro-elastomer are a vinylidene fluoride-base resin, a fluorosilicone-based resin, a polytetrafluoroethylene (PTFE) and the like.

The used of such a material ensures that a conductive bond layer having an excellent high-temperature strength can be formed and is difficult to deform even under the action of the pressure of a transmitted gas resulting from the gasification of the electrolytic solution.

Examples of the conductive particles 132 for the collector, which may be used, are a carbon filler, a graphite filler, a fine metal powder, electrically-insulating particles coated with a conductive material and the like.

The solvent is particularly not limited, but examples of the solvent which may be used are mainly ketones such as methyl ethyl ketone, alcohols such as isopropyl alcohol, glycols such as polyethylene glycol, ethers such as diethyl ether, furans such as tetrahydrofuran, and a mixture of two or more of them.

The mixing ratio of the binder resin to the conductive particles 212 to the solvent is preferable to be in a range of 5 to 20:30 to 55:30 to 55 by weight.

Such a paste is applied onto one of the surfaces of the electrode plate 24 of the lead terminal/electrode plate assembly 22. The application may be carried out in same manner as the step of applying the coating liquid for the collector onto the substrate such as a PET film by a coater.

(S13) Formation of Conductive Bond Layer

The conductive paste applied is heated to gasify off the solvent, thereby forming a conductive bond layer 21 on the electrode plate 24.

The thus-formed conductive bond layer 21 is of a structure in which conductive particles 212 are dispersed moderately in a matrix 211 formed by crosslinking of the binder resin.

If the step of gasifying off the solvent is not carried out, the solvent is left in the conductive bond layer 21, and the solvent left erodes the matrix of the collector and is gasified in a pressing treatment which will be described hereinafter, resulting in a failure of bonding, in some cases.

It is desirable that a starting material for the matrix 211 is an elastomer having a hardness Hs in a range of about 60 (inclusive) to lower than about 85 at ambient temperature.

In this case, the conductive bond layer 21 is elastically deformed to a moderate extent in conformity to the rugged shape of the surface of the collector 13 bonded to the conductive bond layer 21 and thus, the area of an interface between the conductive bond layer 21 and the collector 13 is increased. Therefore, electrical contact points are easily formed in such interface. Even if a gas resulting from the gasification of the electrolytic solution is transmitted through the inside of the collector 13 to reach the interface, the interface can resist the pressure of the transmitted gas and as a result, voids are difficult to appear in the interface.
(S14) Lamination of Cell Structure, Conductive Bond Layer and Electrode Plate The cell structure 20 and the lead terminal/electrode plate assembly 22 are laminated on each other, so that the conductive bond layer 21 comes into contact with the outermost collector 13 of the cell structure 20.

In this lamination, it is desirable that the collector 13 and the conductive bond layer 21 are bonded to each other without formation of voids in the interface therebetween. According to the present invention, the surface shape of the surface of the collector 13 bonded to the conductive bond layer 21 is the rugged shape based on the surface shape of the surface of the polarizable electrode 12 contacting with the collector 13 and opposed to the collector 13 and hence, when the collector 13 and the conductive bond layer 21 are bonded to each other, voids are difficult to be appear in the interface between the collector 13 and the conductive bond layer 21.
(S15) Pressing Treatment A laminate formed at the step S14 is subjected to a pressing treatment. The pressing treatment is carried out by pressing the laminate from outside the lead terminal/electrode assembly 22 in a direction normal to the contact surface of the collector 13, while warming the laminate.
(S16) Sealing of Sheathing Package The laminate of the lead terminal/electrode assembly 22 is covered with a sheathing package 23 in an environment depressurized to a level lower than the atmospheric pressure (this pressure is represented by P2). The outer peripheral edge of the sheathing package 23 is fused thermally and sealed completely, thereby completing an electric double-layer capacitor 1. Therefore, the inside of the electric double-layer capacitor 1 is in a depressurized state having a pressure P2'.

In this case, it is desirable that the pressure P2' is higher than the pressure P1' in the closed space included in the basic cell 10 and lower than the atmospheric pressure.

The pressure in the closed space included in the basic cell 10 is lower than the pressure outside the basic cell 10, whereby the collector 10 is pushed against the polarizable electrode 12 contacting with the collector 10 and thus, the contact area of the interface between the collectors 13 or between the collector 13 and the conductive bond layer 21 is increased, as compared with a case where there is not such a pressure difference. Further, the pressure in the sheathing package 23, i.e., the pressure outside the basic cell 10 is lower than the pressure outside the sheathing package 23, whereby the sheathing package 23 pushes the cell structure 20 and the electrode plate 24 from the side of the electrode plate 24. Such a pushing force is also applied to the interfaces within the cell structure or the interfaces between the collectors forming opposite ends of the cell structure 20 and the conductive bond layers 21. Thus, each of the collectors 13 is pushed further strongly against the polarizable electrode 12 contacting with such collector 13. Therefore, each of the interfaces is roughened under the influence of the roughness of the surface of the polarizable electrode 12 contacting with the collector 13 and opposed to the collector 13. As a result, the contact area of each of the interfaces is further increased, leading to a further enhancement in ESR initial characteristic of the electric double-layer capacitor.

The following particular examples will be described for the good understanding of the present invention. These examples show good embodiments of the present invention definitely.

EXAMPLE 1

First of all, a collector was fabricated. A styrene-ethylene-butylene-styrene block polymer (SEBS) was used as a starting resin material for the collector. This polymer had a hardness Hs equal to or larger than about 60 and smaller than about 80 at 20° C., and a glass transition temperature of −20° C. This starting resin material and carbon-based conductive particles having an average particle size of 50 nm were mixed together at a weight ratio of 10:50 using methyl ethyl ketone as a mixing medium. The resulting coating liquid for a collector was applied onto a substrate made of a PET film having a thickness of 100 $\mu$m by use of a bar coater. The coating liquid on the substrate was heated for 60 minutes at 100° C. to gasify off the methyl ethyl ketone, thereby producing a collector having a size of 3 cm×3 cm and a thickness of 30 $\mu$m. The roughness Ry of the thus-produced collector was 0.5 $\mu$m.

The size of the substrate was determined, so that an exposed portion having a size enough to place a gasket element (which will be described hereinafter) thereon is formed around a periphery of a side of the collector produced at the just above-described step, in such a manner that the surface of the substrate was exposed.

Thereafter, a gasket element, which had a frame-shaped opening capable of accommodating the collector, which was formed of a colorless transparent electrically-insulating polyolefinic ionomer film having a frame thickness of 140 $\mu$m and which had a specific gravity of about 0.93 to about 0.97, was placed on the exposed portion of the substrate, so that it was disposed in close contact with the side of the collector. The gasket element and the collector were thermally fused to each other. Conditions in the thermal fusion were 120° C. and 10 minutes.

Then, a powder of phenolic activated carbon having an average particle size of 15 $\mu$m and a powdery phenol resin binder were mixed together at a weight ratio of 70%:30%, and a coating liquid made by dispersing the resulting mixture in ethanol was supplied to a recess defined by the gasket element and the collector. The particle size of activated carbon particles was confirmed to be 15 $\mu$m on an average and in a range of 10 to 20 $\mu$m, as measured by a laser diffraction process. An assemble comprising the gasket element and the collector and containing the coating liquid was heated and dried to remove the solvent from the coating liquid, thereby aggregating the activated carbon powder to form a polarizable electrode. At this time, the thickness of the polarizable electrode was determined by rubbing-off of the coating liquid in accord with the level of an upper surface of the gasket element and as a result, was about 110 $\mu$m, which is substantially equal to the height of the thickness of the gasket element minus that of the collector.

Then, the polarizable electrode was impregnated with an electrolytic solution comprising an aqueous solution of sulfuric acid. A structure fabricated by the producing steps hitherto described above is referred to as an intermediate product.

Subsequently, a separator of a substantially planar shape made of a polypropylene and having a size of 3.5 cm×3.5 cm and a thickness of 25 $\mu$m was disposed on the gasket element of the intermediate product. At this time, the separator was placed, so that an exposed portion was formed around a periphery of a side of the separator in such a manner that an upper end face of the gasket element of the intermediate product is exposed.

Further, another intermediate product was placed, so that a polarizable electrode thereof was opposed to the separator.

Even in this case, the other intermediate product was placed, so that a portion of an end face of a gasket element of the other intermediate product is exposed. Thus, the two intermediate products were placed in such a manner that the polarizable electrodes sandwiched the separator therebetween in an opposed relation to the separator.

An assembly resulting from the above-described steps was placed in an environment of 1.3 kPa. The assembly was heated at 120° C. for 10 minutes under such depressurization, whereby the two gasket elements were thermally fused integrally to each other to fabricate a basic cell having the substrates.

Subsequently, the basic cell having the substrates was left to stand in an environment at 120° C. for 10 minutes, and the environment was then maintained at 25° C. for one hour.

The two substrates were separated from the basic cell left to stand, thereby completing the basic cell.

The collector of the basic cell had a surface roughness Ry of 9.1 $\mu$m.

The five basic cells produced in the above manner were laminated one on another, so that the collectors in each of the basic formed no voids, thereby producing a cell structure.

On the other hand, independently from the cell structure, a conductive bond layer was formed on one of the electrode plates of the lead terminal/electrode plate assembly in the following manner:

A vinylidene fluoride-based resin was prepared as a binder resin. The vinylidene fluoride-based resin used in this example had a hardness Hs at 20° C. equal to or larger than about 65 and smaller than about 75, and a glass transition temperature of −30° C. This binder resin, conductive particles comprising silver powder particles and a glycol-based solvent were mixed together at a weight ratio of 20:40:40 to form a paste.

The paste was applied onto an electrode plate made of a copper plate plated by tin by a bar coater. The paste on the electrode plate was heated at 150° C. for 30 minutes to gasify off the glycol-based solvent, thereby providing a conductive bond layer having a thickness of 80 $\mu$m.

Then, the cell structure and two pieces of the electrode plates included in the lead terminal/electrode plate assemblies were laminated on each other, so that each of the conductive bond layer was in contact with the outermost electrode of the cell structure without voids.

A laminate comprising the cell structure and the lead terminal/electrode plate was pressed at an atmospheric temperature of 60° C. under a pressure of 100 kPa for one hour.

Thereafter, an integral structure comprising the lead terminal/electrode plate assemblies and the cell structure was placed in an environment having a pressure of 51 kPa. The integral structure comprising the lead terminal/electrode plate assemblies and the cell structure was covered with a sheathing package in such environment, and an outer peripheral edge of the sheathing package was sealed by a thermal fusion at 120° C.

An electric double-layer capacitor was produced through the above-described steps.

EXAMPLE 2

An electric double-layer capacitor was produced in the same manner as in Example 1, except for the use of a collector having a thickness of 30 $\mu$m and made of SEBS as a starting material having a hardness at 20° C. equal to or larger than about 55 and smaller than about 60. The collector of the basic cell in the electric double-layer capacitor produced had a surface roughness Ry of 10.7 $\mu$m.

EXAMPLE 3

An electric double-layer capacitor was produced in the same manner as in Example 1, except for the use of a collector having a thickness of 30 $\mu$m and made of SEBS as a starting material having a hardness at 20° C. equal to or larger than about 80 and smaller than about 85. The collector of the basic cell in the electric double-layer capacitor produced had a surface roughness Ry of 8.9 $\mu$m.

EXAMPLE 4

An electric double-layer capacitor was produced in the same manner as in Example 1, except for the use of a collector having a thickness of 30 $\mu$m and made of SEBS as a starting material having a hardness at 20° C. equal to or larger than about 85 and smaller than about 90. The collector of the basic cell in the electric double-layer capacitor produced had a surface roughness Ry of 5.6 $\mu$m.

EXAMPLE 5

An electric double-layer capacitor was produced in the same manner as in Example 1, except for the use of a collector having a thickness of 50 $\mu$m and made of SEBS as a starting material having a hardness at 20° C. equal to or larger than about 55 and smaller than about 60. The collector of the basic cell in the electric double-layer capacitor produced had a surface roughness Ry of 9.8 $\mu$m.

EXAMPLE 6

An electric double-layer capacitor was produced in the same manner as in Example 1, except for the use of a collector having a thickness of 50 $\mu$m and made of SEBS as a starting material having a hardness at 20° C. equal to or larger than about 60 and smaller than about 80. The collector of the basic cell in the electric double-layer capacitor produced had a surface roughness Ry of 8.6 $\mu$m.

EXAMPLE 7

An electric double-layer capacitor was produced in the same manner as in Example 1, except for the use of a collector having a thickness of 30 $\mu$m and made of SEBS as a starting material having a hardness at 20° C. equal to or larger than about 80 and smaller than about 85. The collector of the basic cell in the electric double-layer capacitor produced had a surface roughness Ry of 6.2 $\mu$m.

EXAMPLE 8

An electric double-layer capacitor was produced in the same manner as in Example 1, except for the use of a collector having a thickness of 30 $\mu$m and made of SEBS as a starting material having a hardness at 20° C. equal to or larger than about 85 and smaller than about 90. The collector of the basic cell in the electric double-layer capacitor produced had a surface roughness Ry of 3.8 $\mu$m.

EXAMPLE 9

An electric double-layer capacitor was produced in the same manner as in Example 1, except for the use of a collector having a thickness of 80 $\mu$m and made of SEBS as a starting material having a hardness at 20° C. equal to or larger than about 50 and smaller than about 65. The collector of the basic cell in the electric double-layer capacitor produced had a surface roughness Ry of 5.8 $\mu$m.

EXAMPLE 10

An electric double-layer capacitor was produced in the same manner as in Example 1, except for the use of a collector having a thickness of 80 μm and made of SEBS as a starting material having a hardness at 20° C. equal to or larger than about 55 and smaller than about 60. The collector of the basic cell in the electric double-layer capacitor produced had a surface roughness Ry of 5.6 μm.

EXAMPLE 11

An electric double-layer capacitor was produced in the same manner as in Example 1, except for the use of a collector having a thickness of 80 μm and made of SEBS as a starting material having a hardness at 20° C. equal to or larger than about 60 and smaller than about 80. The collector of the basic cell in the electric double-layer capacitor produced had a surface roughness Ry of 5.4 μm.

EXAMPLE 12

An electric double-layer capacitor was produced in the same manner as in Example 1, except for the use of a collector having a thickness of 80 μm and made of SEBS as a starting material having a hardness at 20° C. equal to or larger than about 80 and smaller than about 85. The collector of the basic cell in the electric double-layer capacitor produced had a surface roughness Ry of 5.1 μm.

EXAMPLE 13

An electric double-layer capacitor was produced in the same manner as in Example 1, except for the use of a collector having a thickness of 80 μm and made of SEBS as a starting material having a hardness at 20° C. equal to or larger than about 85 and smaller than about 90. The collector of the basic cell in the electric double-layer capacitor produced had a surface roughness Ry of 3.3 μm.

EXAMPLE 14

An electric double-layer capacitor was produced in the same manner as in Example 1, except for the use of a collector having a thickness of 100 μm and made of SEBS as a starting material having a hardness at 20° C. equal to or larger than about 50 and smaller than about 55. The collector of the basic cell in the electric double-layer capacitor produced had a surface roughness Ry of 2.0 μm.

EXAMPLE 15

An electric double-layer capacitor was produced in the same manner as in Example 1, except for the use of a collector having a thickness of 100 μm and made of SEBS as a starting material having a hardness at 20° C. equal to or larger than about 55 and smaller than about 60. The collector of the basic cell in the electric double-layer capacitor produced had a surface roughness Ry of 5.5 μm.

EXAMPLE 16

An electric double-layer capacitor was produced in the same manner as in Example 1, except for the use of a collector having a thickness of 100 μm and made of SEBS as a starting material having a hardness at 20° C. equal to or larger than about 60 and smaller than about 80. The collector of the basic cell in the electric double-layer capacitor produced had a surface roughness Ry of 5.2 μm.

EXAMPLE 17

An electric double-layer capacitor was produced in the same manner as in Example 1, except for the use of a collector having a thickness of 100 μm and made of SEBS as a starting material having a hardness at 20° C. equal to or larger than about 80 and smaller than about 85. The collector of the basic cell in the electric double-layer capacitor produced had a surface roughness Ry of 2.8 μm.

EXAMPLE 18

An electric double-layer capacitor was produced in the same manner as in Example 1, except for the use of a collector having a thickness of 100 μm and made of SEBS as a starting material having a hardness at 20° C. equal to or larger than about 85 and smaller than about 90. The collector of the basic cell in the electric double-layer capacitor produced had a surface roughness Ry of 2.8 μm.

EXAMPLE 19

An electric double-layer capacitor was produced in the same manner as in Example 1, except for the use of a collector having a thickness of 150 μm and made of SEBS as a starting material having a hardness at 20° C. equal to or larger than about 50 and smaller than about 55. The collector of the basic cell in the electric double-layer capacitor produced had a surface roughness Ry of 3.0 μm.

EXAMPLE 20

An electric double-layer capacitor was produced in the same manner as in Example 1, except for the use of a collector having a thickness of 150 μm and made of SEBS as a starting material having a hardness at 20° C. equal to or larger than about 55 and smaller than about 60. The collector of the basic cell in the electric double-layer capacitor produced had a surface roughness Ry of 2.6 μm.

EXAMPLE 21

An electric double-layer capacitor was produced in the same manner as in Example 1, except for the use of a collector having a thickness of 80 μm and made of SEBS as a starting material having a hardness at 20° C. equal to or larger than about 60 and smaller than about 80. The collector of the basic cell in the electric double-layer capacitor produced had a surface roughness Ry of 2.1 μm.

EXAMPLE 22

An electric double-layer capacitor was produced in the same manner as in Example 1, except for the use of a collector having a thickness of 80 μm and made of SEBS as a starting material having a hardness at 20° C. equal to or larger than about 80 and smaller than about 85. The collector of the basic cell in the electric double-layer capacitor produced had a surface roughness Ry of 1.5 μm.

EXAMPLE 23

An electric double-layer capacitor was produced in the same manner as in Example 1, except for the use of a collector having a thickness of 80 μm and made of SEBS as a starting material having a hardness at 20° C. equal to or larger than about 85 and smaller than about 90. The collector of the basic cell in the electric double-layer capacitor produced had a surface roughness Ry of 0.9 μm.

EXAMPLE 24

An electric double-layer capacitor was produced in the same manner as in Example 1, except that the pressure at the step of thermally fusing two intermediate products in the basic cell-producing course was about 51 kPa.

EXAMPLE 25

An electric double-layer capacitor was produced in the same manner as in Example 1, except that the pressure at the step of thermally fusing two intermediate products in the basic cell-producing course was about 21 kPa.

EXAMPLE 26

An electric double-layer capacitor was produced in the same manner as in Example 1, except that the pressure at the step of thermally fusing two intermediate products in the basic cell-producing course was about 130 kPa.

EXAMPLE 27

An electric double-layer capacitor was produced in the same manner as in Example 1, except that the pressure at the step of thermally fusing two intermediate products in the basic cell-producing course was about 67 kPa.

COMPARATIVE EXAMPLE 1

An electric double-layer capacitor was produced in the same manner as in Example 1, except that the step of thermally fusing two intermediate products in the basic cell-producing course was carried out under the atmospheric pressure.

COMPARATIVE EXAMPLE 2

An electric double-layer capacitor was produced in the same manner as in Example 1, except that the step of thermally fusing two intermediate products in the basic cell-producing course was carried out under a pressure of about 13 Pa.

Results of measurement of the surface roughness Ry in Examples 1 to 23 are shown in Table 1. In Table 1, the Example number is shown in a left side in each column and the surface roughness Ry was shown in unit of $\mu$m in a right side in each column.

TABLE 1

| Hardness Hs of elastomer material for collector | Thickness of collector, $\mu$m | | | | | | | | | |
|---|---|---|---|---|---|---|---|---|---|---|
| | 30 | | 50 | | 80 | | 100 | | 150 | |
| 50–55 | | | | | 9 | 5.8 | 14 | 2.0 | 19 | 3.0 |
| 55–60 | 2 | 10.7 | 5 | 9.8 | 10 | 5.6 | 15 | 5.5 | 20 | 2.6 |
| 60–80 | 1 | 9.1 | 6 | 8.6 | 11 | 5.4 | 16 | 5.2 | 21 | 2.1 |
| 80–85 | 3 | 8.9 | 7 | 6.2 | 12 | 5.1 | 17 | 5.0 | 22 | 1.5 |
| 85–90 | 4 | 5.6 | 8 | 3.8 | 13 | 3.3 | 18 | 2.8 | 23 | 0.9 |

Each of samples in Examples and samples in Comparative Examples was subjected to the measurement of ESR (initial ESR) immediately after the fabrication of the capacitor and the measurement of ESR (durability ESR) after a durability test.

Conditions for the durability test and for the measurement of the initial ESR and the durability ESR are as follows:

(A) Initial ESR

The 100 samples (electric double-layer capacitors) fabricated under the conditions shown in each of Examples were prepared and subjected to the measurement of ESR, and an average value was determined in each case. These initial ESR average values were estimated in correspondence to the following regions of numerical values and affixed with characters, as shown below.

$80 \leq R < 100$: the initial ESR is extremely low (S)
$100 \leq R < 120$: the initial ESR is particularly low (A)
$120 \leq R < 150$: the initial ESR is low (B)
$150 \leq R < 200$: the initial ESR is rather low (C)
$200 \leq R$: the initial ESR is high (D)

The frequency for the measurement of ESR was set at 1 kHz.

(B) Durability ESR

Each of the samples after the measurement of the initial ESR was subjected to a durability test in which a voltage 1.3 times the rated volume was applied continuously for 500 hours. A rate x of variation in ESR before and after the test was calculated, and a long-term reliability (a stability of electric characteristic in the long-term service) was estimated based on the variation rate x.

The durability ESR value (the long-term reliability) was estimated in correspondence to regions of numerical values of ESR variation rates x.

$x \leq 1.2$: the long-term reliability is very high (S)
$1.2 < x \leq 2.0$: the long-term reliability is high (A)
$2.0 < x \leq 3.0$: the long-term reliability is provided (B)
$3.0 < x \leq 4.0$: the long-term reliability can be expected (C)
$4.0 < x$: the long-term reliability cannot be provided (D)

The frequency for the measurement of ESR was set at 1 kHz.

(3) Test Results a) Initial ESR

Results of the estimation of the initial ESR values are shown in Table 2.

TABLE 2

| Hardness Hs of elastomer material for collector | Thickness of collector ($\mu$m) | | | | |
|---|---|---|---|---|---|
| | 30 | 50 | 80 | 100 | 150 |
| 50–55 | | | B | C | C |
| 55–60 | S | A | A | B | C |
| 60–80 | S | A | A | B | C |
| 80–85 | S | A | A | B | C |
| 85–90 | B | C | C | C | C |

In the electric double-layer capacitors in any of the estimation ranges, the initial ESR value equal to or higher than the value in the range of "initial ESR can be expected" was obtained. Particularly, when the hardness Hs of the starting resin material for the collector was equal to 55 and smaller than 85 and the thickness of the collector was in the range of 30 $\mu$m to 100 $\mu$m, when the hardness Hs of the starting resin material for the collector was equal to 85 and smaller than 90 and the thickness of the collector was 30 $\mu$m, and when the hardness Hs of the starting resin material for the collector was equal to 50 and smaller than 55 and the thickness of the collector was 80 $\mu$m, the estimation result equivalent to or above "the ESR value is low" was obtained.

If the measurement results are considered in combination, when the surface roughness Ry of the collector is equal to or larger than 5 $\mu$m, the result of the measurement of the initial ESR is equivalent to or above "the ESR value is low" was obtained.

b) Durability ESR

The relationship between the hardness of the starting resin material for the collector, the thickness of the collector film and the durability ESR is shown in Table 3.

TABLE 3

| Hardness of elastomer material for collector | Thickness of collector (μm) | | | | |
|---|---|---|---|---|---|
| | 30 | 50 | 80 | 100 | 150 |
| 50–55 | | | B | C | C |
| 55–60 | A | A | A | B | C |
| 60–80 | A | A | A | B | C |
| 80–85 | A | A | B | B | C |
| 85–90 | B | C | C | C | C |

In the electric double-layer capacitor in any of the estimation ranges, the estimation result equivalent to or above "the long-term reliability can be expected" was obtained. Particularly, when the hardness Hs of the starting resin material for the collector was equal to 55 and smaller than 85 and the thickness of the collector was in the range of 30 μm to 100 μm, when the hardness Hs of the starting resin material for the collector was equal to 85 and smaller than 90 and the thickness of the collector was 30 μm, and when the hardness Hs of the starting resin material for the collector was equal to 50 and smaller than 55 and the thickness of the collector was 80 μm, the estimation result equivalent to or above "the long-term reliability is provided" was obtained.

This result is comparable to a good durability ESR equivalent to or above "the long-term reliability is provided" in the estimation of the durability ESR (the long-term reliability), when the surface roughness Ry of the collector is equal to or larger than 5 μm. This shows the same tendency as the above-described result of the initial ESR.

(Influence of Depressurization)

The relationship between the pressure p1 at the thermally fusing step in the procedure of producing the basic cell and the initial ESR characteristic is shown in Table 4.

| Pressure at thermally fusing step, Pa | Initial ESR characteristic |
|---|---|
| 1.0E+05 | D |
| 5.1E + 04 | C |
| 2.1E + 04 | B |
| 1.3E + 03 | A |
| 1.3E + 02 | B |
| 6.7E + 01 | C |
| 1.3E + 01 | D |

As a result of the estimation of the initial ESR when the pressure p1 was in a range of 51 kPa to 67 Pa, the initial ESR equal to or lower "the ESR value is rather low" was obtained.

When the pressure p1 was equal to the atmospheric pressure, a difference between the pressure p1 and the pressure within the sheathing package is equal to 0 (zero) or positive and hence, the basic cell was brought into an expanded state. For this reason, a preferred result for the initial ESR characteristic was not obtained. Even when the pressure p1 was 51 kPa, a phenomenon similar to that provided under the pressure p1 equal to the atmospheric pressure was confirmed, depending on the producing conditions.

On the other hand, when the pressure p1 was 13 Pa, the boiling of the electrolytic solution was observed in the producing procedure, and a preferred result for the initial ESR characteristic was not obtained. When the pressure p1 is 67 Pa, the slight boiling of the electrolytic solution was observed in the producing procedure, but the initial ESR characteristic was rather good. Thus, the influence exerted to the initial ESR characteristic by the boiling of the electrolytic solution was very small.

What is claimed is:

1. An electric double-layer capacitor, comprising
   a cell structure formed by laminating basic cells in series one on another, each of said basic cells including a pair of collectors, a separator disposed between said collectors, gaskets disposed at peripheral edges of said pair of collectors and said separator to define a pair of closed spaces, and a pair of polarizable electrodes which are disposed in said closed spaces defined by said collectors, said separator and said gaskets, respectively and which contain an electrolytic solution, said basic cells being laminated one on another with a back of each of said collectors opposed to said polarizable electrode serving as a connection surface;
   a lead terminal/electrode plate assembly having electrode plates bonded to said collectors located at opposite ends of said cell structure through conductive bond layers; and
   at least one of interfaces between said collectors included in said cell structure has a surface shape based on a rugged surface shape of the surface of said polarizable electrode contacting with and opposed to at least one of the two collectors forming said interface.

2. An electric double-layer capacitor according to claim 1, wherein the pressure in each of said closed spaces included in the basic cell is lower than the pressure outside the basic cell and equal to or higher than 67 Pa.

3. An electric double-layer capacitor according to claim 2, further including a sheathing package for sealing said cell structure and the lead terminal/electrode assembly therein, the pressure in said sheathing package being lower than the pressure outside said sheathing package and higher than the pressure in each of the closed spaces included in said basic cell.

4. An electric double-layer capacitor according to claim 1, wherein said collector includes an elastomer film.

5. An electric double-layer capacitor according to claim 1, wherein at least one of surfaces of the collectors included in said basic cells before being laminated to form said cell structure, which is bonded to the other collector, has a surface roughness Ry in a range of about 5 μm to about 100 μm.

6. An electric double-layer capacitor according to claim 1, wherein at least one of surfaces of the collectors located at opposite ends of said cell structure and bonded to the conductive bond layer has a surface shape based on the rugged surface shape of the polarizable electrode contacting with a back bonded to said conductive bond layer.

7. An electric double-layer capacitor according to claim 6, wherein the pressure in each of the closed spaces included in said basic cell is lower than the pressure outside the basic cell and equal to or higher than 67 Pa.

8. An electric double-layer capacitor according to claim 7, further including a sheathing package for sealing said cell structure and the lead terminal/electrode assembly therein, the pressure in said sheathing package being lower than the pressure outside said sheathing package and higher than the pressure in each of the closed spaces included in said basic cell.

9. An electric double-layer capacitor according to claim 6, wherein said collector includes an elastomer film.

10. An electric double-layer capacitor according to claim 6, wherein at least one of surfaces of the collectors included in said basic cells before being laminated to form said cell structure, which is bonded to the other collector, has a surface roughness Ry in a range of about 5 μm to about 100 μm.

11. An electric double-layer capacitor comprising
a basic cell including a pair of collectors, a separator disposed between said collectors, gaskets disposed at peripheral edges of said pair of collectors and said separator to define a pair of closed spaces, and a pair of polarizable electrodes which are disposed in said closed spaces defined by said collectors, said separator and said gaskets, respectively and which contain an electrolytic solution,
a lead terminal/electrode plate assembly including electrode plates bonded to said basic cell through conductive bond layers, with at least one of backs of the collectors of the basic cell, which are opposed to the polarizable electrodes, serving as a connection surface; and
the surface of at least one of said collectors forming an interface with said conductive bond layer has a surface shape based on the rugged surface shape of the polarizable electrode contacting with said collector.

12. An electric double-layer capacitor according to claim 11, wherein the pressure in each of the closed spaces included in said basic cell is lower than the pressure outside the basic cell and equal to or higher than 67 Pa.

13. An electric double-layer capacitor according to claim 12, further including a sheathing package for sealing said cell structure and said lead terminal/electrode assembly therein, the pressure in said sheathing package being lower than the pressure outside said sheathing package and higher than the pressure in each of the closed spaces included in said basic cell.

14. An electric double-layer capacitor according to claim 11, wherein said collector includes an elastomer film.

15. An electric double-layer capacitor according to claim 6, wherein at least one of surfaces of the collectors included in said basic cells before being laminated to form said cell structure, which is bonded to the other collector, has a surface roughness Ry in a range of about 5 $\mu$m to about 100 $\mu$m.

16. A process for producing an electric double-layer capacitor, comprising the steps of
(A) putting a collector on a flat plate and a frame-shaped gasket element having an opening into abutment against each other to define a recess with a bottom surface formed by said collector and sides formed by the inner sides of the opening in said gasket element,
(B) disposing a polarizable electrode impregnated with an electrolytic solution,
(C) placing two intermediate products fabricated through said steps (A) and (B) and a flat plate-shaped separator, so that end faces of said gasket elements forming the openings in said intermediate products are put into abutment against peripheral edges of thickness-wise opposite surfaces of said separator,
(D) thermally fusing said two gasket elements included in an assembly resulting from said step (C) integrally to each other under a pressure lower than the atmospheric pressure and equal to or higher than 67 Pa to form a gasket, and covering a side of the separator with the gasket, thereby forming a basic cell including the two intermediate products and the separator integrally bonded to each other,
(E) laminating a plurality of said basic cells formed in the above manner in series one on another, so that backs of the collectors included in each of the basic cells contacting with the polarizable electrodes are bonded surfaces, thereby forming a cell structure,
(F) putting the two collectors forming opposite ends of the cell structure into abutment against electrode plates included in a lead terminal/electrode plate assembly through conductive bond layers, and
(G) pressing the surface of a laminate fabricated at said step (F), which is in abutment against the collector, from outside said electrode plates included in said lead terminal/electrode plates.

17. A process for producing an electric double-layer capacitor according to claim 16, wherein a step of sealing the laminate pressed at said step (G) into a sheathing package is carried out under a pressure equal to or lower than the atmospheric pressure, so that the electric double-layer capacitor is formed in such a manner that the pressure between said laminate pressed at said step (G) and the inside of said sheathing package is lower than the atmospheric pressure and higher than the pressure in each of the closed spaces included in said basic cell formed at said step (D).

18. A process for producing an electric double-layer capacitor, comprising the steps of
(H) putting a collector on a flat plate and a frame-shaped gasket element having an opening into abutment against each other to define a recess with a bottom surface formed by said collector and sides formed by the inner sides of the opening in said gasket element,
(I) disposing a polarizable electrode impregnated with an electrolytic solution,
(J) placing two intermediate products fabricated through said steps (H) and (I) and a flat plate-shaped separator, so that end faces of said gasket elements forming the openings in said intermediate products are put into abutment against peripheral edges of thickness-wise opposite surfaces of said separator,
(K) thermally fusing said two gasket elements included in an assembly resulting from said step (J) integrally to each other under a pressure lower than the atmospheric pressure and equal to or higher than 67 Pa to form a gasket, and covering a side of the separator with the gasket, thereby forming a basic cell including the two intermediate products and the separator integrally bonded to each other,
(L) putting the two collector included in said basic cell and electrode plates included in a lead terminal/electrode plate assembly into abutment against each other through conductive bond layer, and
(M) pressing a laminate formed at said step (L) from outside electrode plate included in the lead terminal/electrode assembly in a direction normal to the abutment surface of said collector.

19. A process for producing an electric double-layer capacitor according to claim 18, wherein a step of sealing the laminate pressed at said step (M) into a sheathing package is carried out under a pressure equal to or lower than the atmospheric pressure, so that the electric double-layer capacitor is formed in such a manner that the pressure between said laminate pressed at said step (M) and the inside of said sheathing package is lower than the atmospheric pressure and higher than the pressure in each of the closed spaces included in said basic cell formed at said step (K).

* * * * *